(12) United States Patent
Mon

(10) Patent No.: US 11,837,858 B1
(45) Date of Patent: Dec. 5, 2023

(54) ELECTRICAL BOX WITH FASTENING DEVICES

(71) Applicant: George Emmanuel Mon, Ladera Ranch, CA (US)

(72) Inventor: George Emmanuel Mon, Ladera Ranch, CA (US)

( * ) Notice: Subject to any disclaimer, the term of this patent is extended or adjusted under 35 U.S.C. 154(b) by 0 days.

(21) Appl. No.: 18/323,273

(22) Filed: May 24, 2023

(51) Int. Cl.
*H02G 3/12* (2006.01)

(52) U.S. Cl.
CPC .................................. *H02G 3/121* (2013.01)

(58) Field of Classification Search
CPC .......... H02G 3/08; H02G 3/081; H02G 3/121; H02G 3/123; H05K 5/00; H05K 5/02; H05K 5/0217; H05K 5/0247; H05K 7/00; H01R 13/46; H01R 13/53
USPC .... 174/480, 481, 50, 53, 57, 58, 61, 62, 63; 220/3.2–3.9, 4.02; 248/906
See application file for complete search history.

(56) References Cited

U.S. PATENT DOCUMENTS

| | | | | |
|---|---|---|---|---|
| 4,747,506 A * | 5/1988 | Stuchlik, III | .......... | H02G 3/125 220/3.9 |
| 5,600,093 A * | 2/1997 | Herth | ..................... | H02G 3/123 220/3.9 |
| 6,720,496 B1 * | 4/2004 | Weeks | ..................... | H02G 3/20 174/57 |
| 6,756,541 B1 * | 6/2004 | Mollick | .................... | H02G 3/14 33/528 |
| 6,956,168 B2 * | 10/2005 | Herth | ..................... | H02G 3/126 220/3.9 |
| 7,307,213 B1 * | 12/2007 | Gretz | ..................... | H02G 3/086 174/53 |
| 7,378,590 B1 * | 5/2008 | Herth | ....................... | H02G 3/12 174/64 |
| 7,476,807 B1 * | 1/2009 | Gretz | ..................... | H02G 3/123 174/64 |
| 7,855,338 B2 * | 12/2010 | Troder | .................... | H02G 3/10 174/64 |
| 8,415,563 B1 * | 4/2013 | Shotey | ................... | H02G 3/126 439/535 |
| 8,664,526 B2 * | 3/2014 | Charbonneau | ........... | H02G 3/16 174/59 |
| 8,704,107 B2 * | 4/2014 | Laukhuf | ................ | H02G 3/126 220/3.9 |
| 10,079,482 B2 * | 9/2018 | Legault | .................. | H02G 3/126 |
| 11,646,558 B2 * | 5/2023 | Mon | ...................... | H02G 3/123 174/50 |

* cited by examiner

*Primary Examiner* — Angel R Estrada

(57) ABSTRACT

An electrical box which utilizes fastening devices to provide improved box fastening to wall assembly materials with common fasteners. The electrical box possesses one or a plurality of externally situated fastener housings each with characteristics that support fastener placement, guide fastener insertion, limit fastener travel and house the fastener, once fully driven, outside of the box body interior. The externally situated fastener housing's placement outside of the box body allows for fastener insertion from the box body interior while not diminishing volumetric capacity of the box body. Alternative embodiments include round enclosure and bottom mount versions.

18 Claims, 21 Drawing Sheets

ELECTRICAL BOX WITH FASTENING DEVICES

REFERENCE TO RELATED PATENTS

This application claims the benefit of U.S. Utility Pat. No. 11,646,558B2, Air Sealing Electrical Box, George E. Mon as sole inventor, the contents of which are incorporated herein by reference in its entirety.

FIELD OF THE INVENTION

The present invention relates to electrical boxes used in new and old construction electrical and communications systems and specifically regards methods of installing the boxes in typical construction.

BACKGROUND OF THE INVENTION

Electrical boxes or enclosures are required for handling cabling and wiring, for connecting receptacles and switches to conductors and for distribution of communications cabling in building assemblies.

The boxes or enclosures are generally of different types designed to be used in new or existing construction and to accommodate various quantities of cabling, wiring and outlets.

Fastening devices that provide for improved ease of box installation while not diminishing the volumetric capacity of the box body are contemplated.

Modifications to electrical boxes used to control airflow around them may require enhanced electrical box fastening methods.

SUMMARY OF THE INVENTION

The Electrical Box With Fastening Devices various embodiments improve electrical box to building assembly fastening capabilities and installation stability.

In the preferred embodiment, the fastening devices are principally comprised of an externally situated fastener housing placed at two locations at an electrical box body exterior wall. The box body and housings are designed in such a manner that permit fasteners to be driven from the box front open face through the box body interior into framing.

The electrical box body possesses openings which interface with the externally situated fastener housings allowing for fastener insertion from inside the box body.

The following five paragraphs below itemize five characteristics of the Electrical Box With Fastening Devices that provide novelty and specify how it is an improvement over prior art front face fastening electrical boxes.

1. Placement of the housings external to the box body allow the entirety of the fasteners, including the head, once driven, to reside separated from the box body interior and away from outlets and wiring thus providing a safer installation. The installation is more likely to satisfy National Electrical Code 314.23(b)(1) regarding structural mounting with nails and screws and thus be more likely to achieve UL, NEMA or IP listing or rating.

2. No part of the fasteners, once installed, protrude into the box interior diminishing the risk the authority having jurisdiction will object to a field supplied fastener, if used. For this type of installation, the need to protect any portion of the fastener with caulks or other means is eliminated.

3. The external to the box body placement of the fastener housing does not decrease the volume of the box body available for electrical or communications components, cabling and wiring.

4. The design of the externally situated fastener housing does not require any supplemental components to facilitate fastener placement and insertion into framing allowing for simpler and more efficient box manufacture and distribution.

5. The design of the housing complements the tapered shape of some box bodies and the offsetting feature of some air sealing flanges. The fastener housing portions coming into contact with framing and the framing itself are now coplanar and thus the installed box front face will be generally vertical.

Significant additional features of the electrical box are described below.

The design of the housing provides a fastener recess which restricts fastener movement to the direction of desired insertion. This guides fastener insertion into wall framing allowing enhanced fastener directional stability and a more consistently correct installation. The design also limits fastener travel to assure proper fastener depth into framing.

Installation may be facilitated as the form and placement of the housings allow for optional fastener presentation by the manufacturer eliminating the requirement for the end user to place the fastener.

The electrical box with fastening devices may be used for new and old work where either vertical or horizontal framing is adjacent to the proposed box location.

As with typical electrical boxes, the presented electrical box has a body including four sides and a back all formed together where they meet with a box body face open (for rectangular boxes) or a cylindrical or ovalized shape and back formed together where they meet with an enclosure body face open (for round enclosures). Throughout this application the term box is used for square or rectangular electrical boxes and the term enclosure for those that are round.

The externally situated fastener housings permit the boxes or enclosures to be placed to the left or right of, and in some embodiments, above or below a framing member by rotating it 180 degrees as their respective bodies are generally symmetrical about the longitudinal or transverse axes.

Boxes using these devices provide for installation not just of single gang boxes but of larger multi-gang boxes of various sizes (2, 3, 4 gang boxes etc.).

In an alternative embodiment, the externally situated fastener housings can optionally be placed on the exterior of the same box body side as the outlet mounting screw holes and the box structure forming them. This is referred to as a bottom mount and is especially useful for multi-gang boxes installed along horizontal blocking where vertical members occur at separation such as 24 inches on center.

The externally situated fastener housing may be modified with chamfers or other modifications to provide manufacturing efficiencies. In such embodiments, the exterior envelope of the housing will substantially follow the outer contours of the preferred embodiment to assure similar functionality.

FIGS. 4-21 presented in this application employ, as non-limiting illustrations, a flange and channel element to optionally provide air sealing at the box/wall assembly interface. The claimed Electrical Box with Fastening Devices does not require this optional element to function. This flange and channel element is not used when the claimed Electrical Box with Fastening Devices is placed in old work assemblies.

The particular flange and channel element shown FIGS. 4-21 is the subject of U.S. Pat. No. 11/646,558B2 by the same sole inventor as the current application. In all figures, broken lines depict the flange and channel element as environmentally illustrative and forming no part of the claimed Electrical Box with Fastening Devices of the current application. The term non-claimed referring to the flange and channel element means not claimed by this application only.

DETAILED DESCRIPTION OF THE INVENTION

Figure 1:
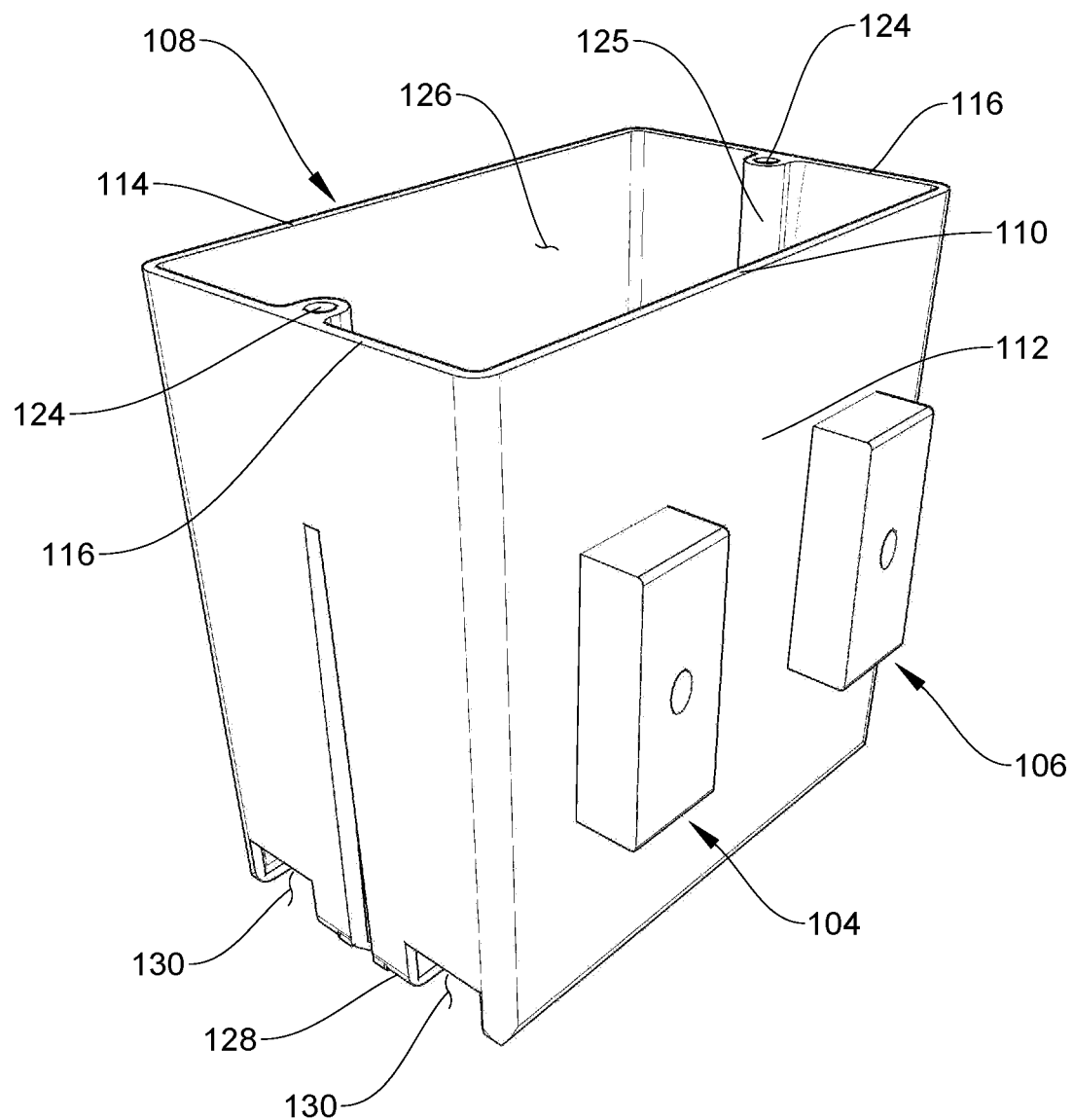
FIG. 1 is a perspective view of the preferred embodiment of the invention principally showing the box housing side and one transverse side.
Figure 2:
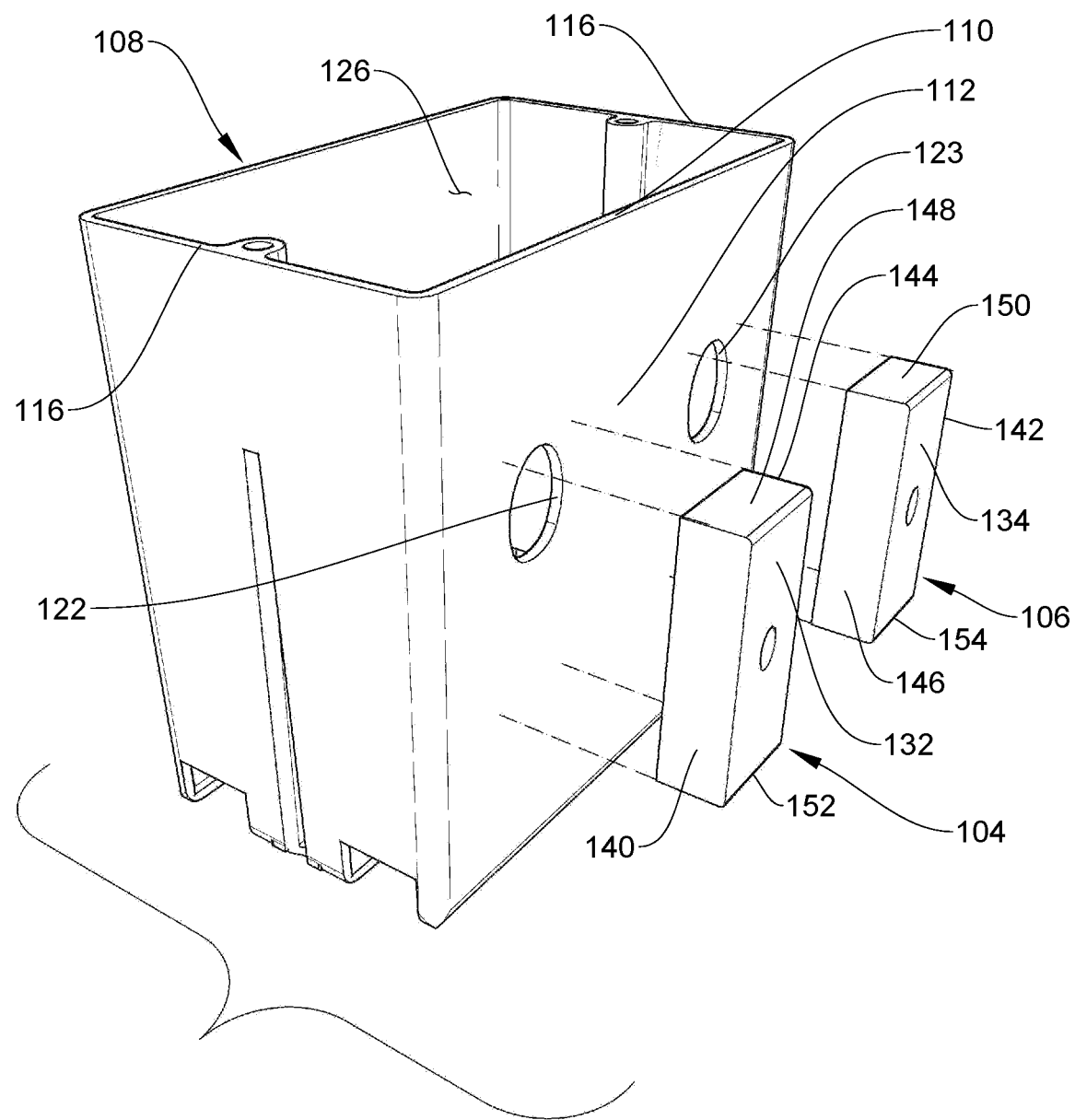
FIG. 2 is an exploded perspective view of the electrical box of FIG. 1 showing the externally situated fastener housings separated from the box body and the box housing side exterior wall.
Figure 3:
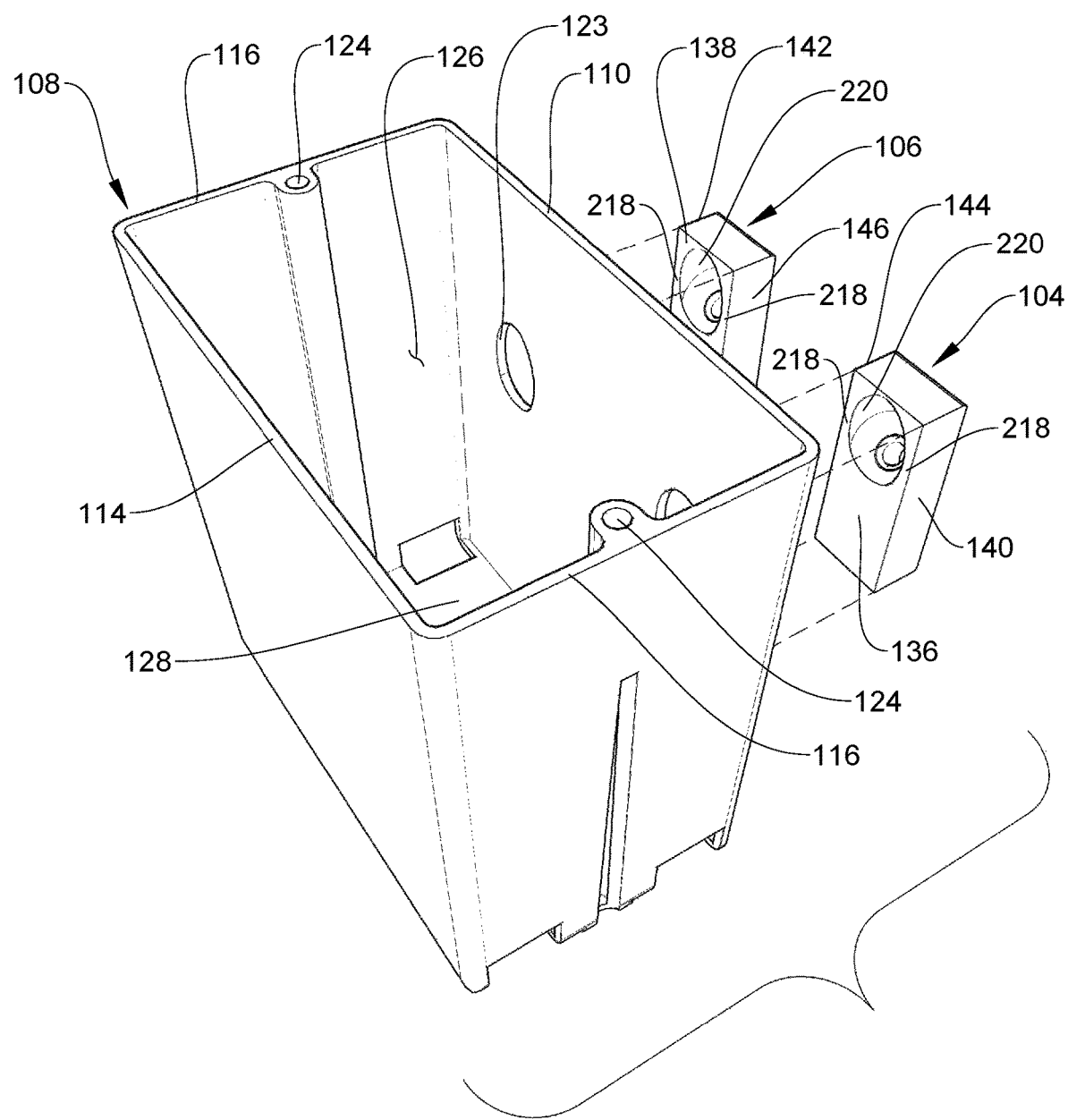
FIG. 3 is an alternate exploded perspective view of the electrical box of FIG. 1 showing the externally situated fastener housings separated from the box body and portions of the box body interior.

Referring to FIGS. 1-3: The Electrical Box With Fastening Devices preferred embodiment is principally comprised of a single unitary device formed by a first (104) and second (106) externally situated fastener housing being placed immediately adjacent to an electrical box body (108) box body housing side (110) at an exterior wall (112). The electrical box may be fastened to a building assembly with standard fasteners placed through box body openings (122, 123) formed in the box body and recesses in the externally situated fastener housings formed at an angle which facilitates fastener penetration into adjoining framing materials. The preferred fasteners are screws and are not claimed by this application.

The Electrical Box With Fastening Devices may possess one or a plurality of externally situated fastener housings; the embodiments employing two fastener housings are presented in FIGS. 1-18 and FIG. 21 as non-limiting examples. Fastener housing portions referenced together are understood to reference the particular first and second fastener housing portion, in that order.

The transverse sides (116) of single-gang boxes have outlet mounting screw threaded holes (124) with standard threading to accomplish fastening of receptacle or switch yokes (not shown) to the box with screws. The box body housing side (110) is located at one of the box sides generally orthogonal to the side possessing the outlet mounting screw threaded holes and the mounting structure (125) that forms them. This would be one of the longitudinal sides for a single outlet box. The box body side opposite the housing side is the box body non-housing side (114) and is as with typical electrical boxes.

Figure 16:
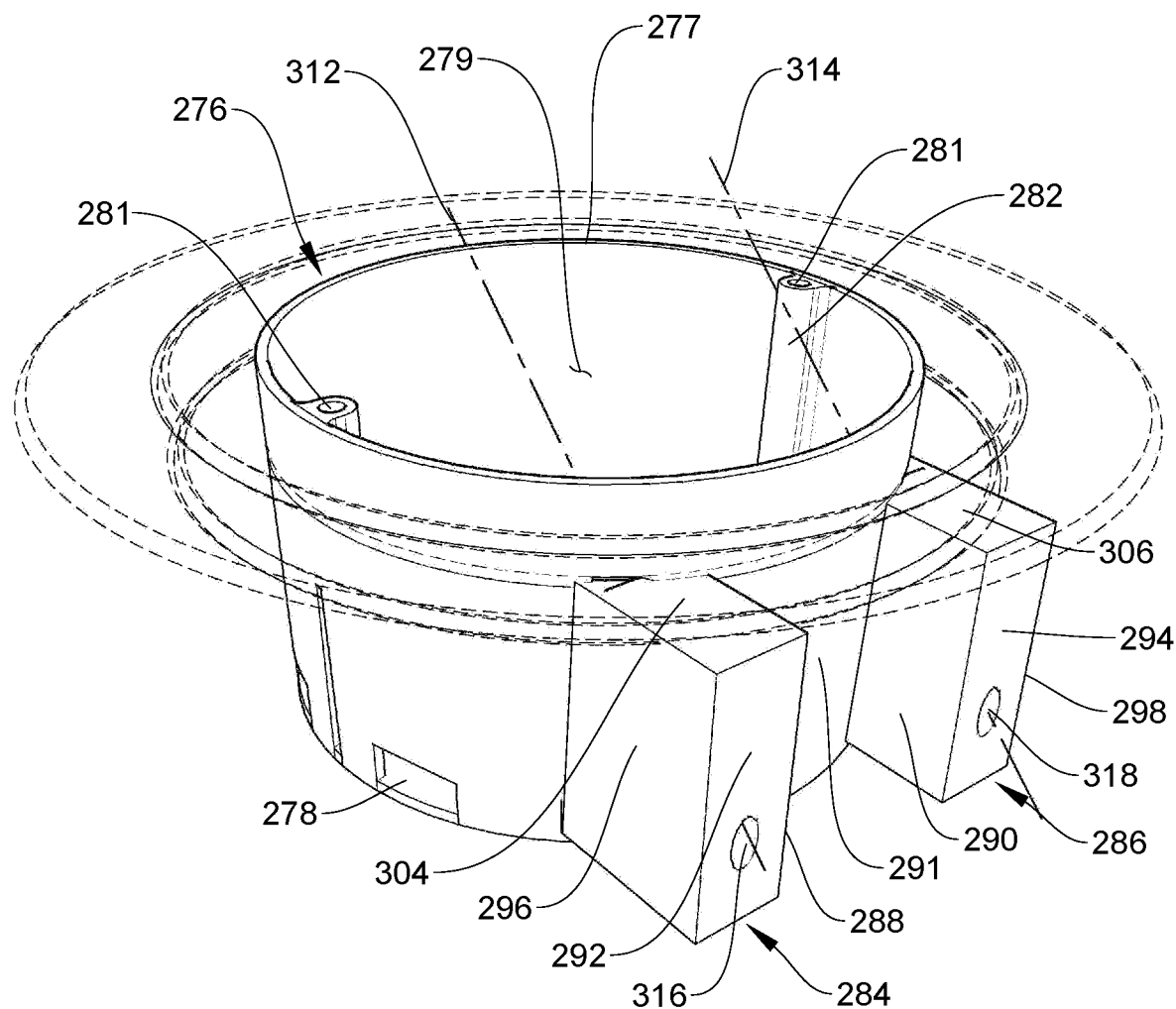
FIG. 16 is a perspective view of the round enclosure embodiment of the invention, employing a non-claimed flange and channel element, showing the round enclosure externally situated fastener housings.
Figure 17:
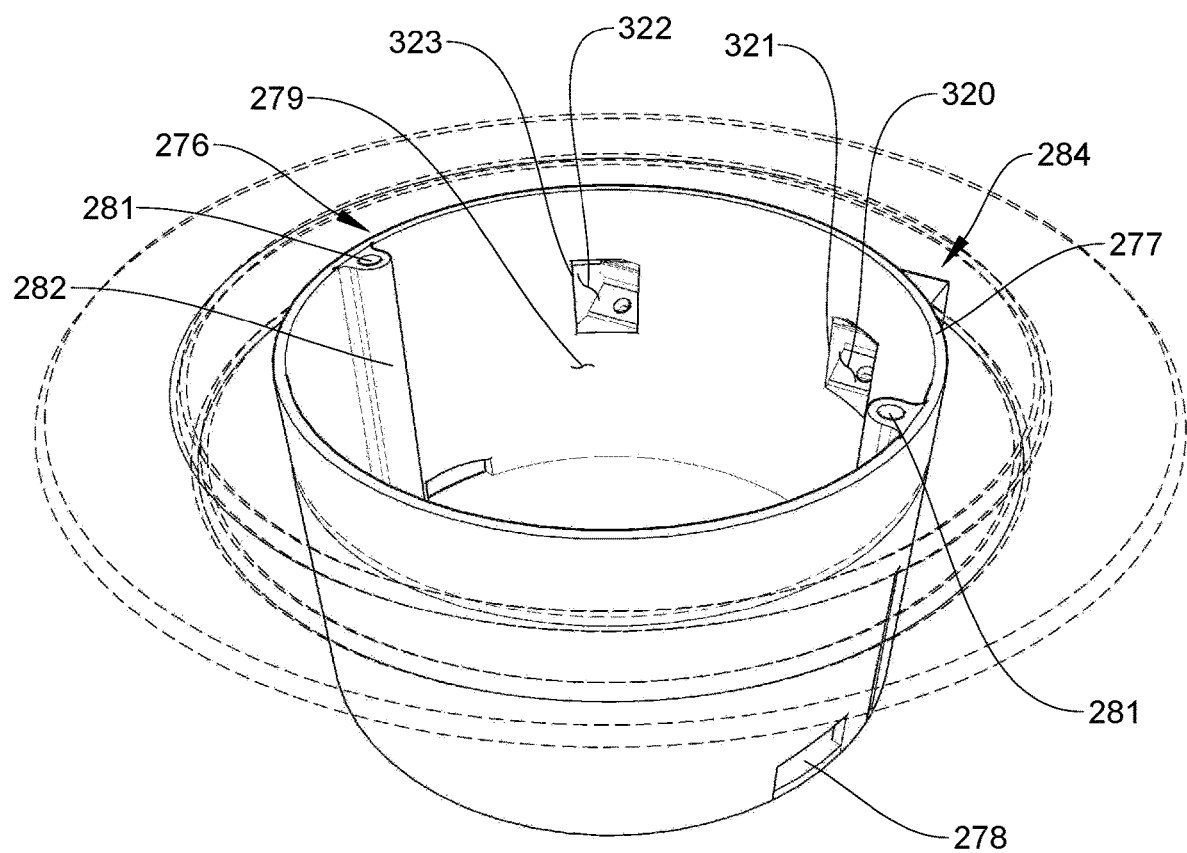
FIG. 17 is an alternate perspective view of the electrical box of FIG. 16 showing the round enclosure body interior.
Figure 18:
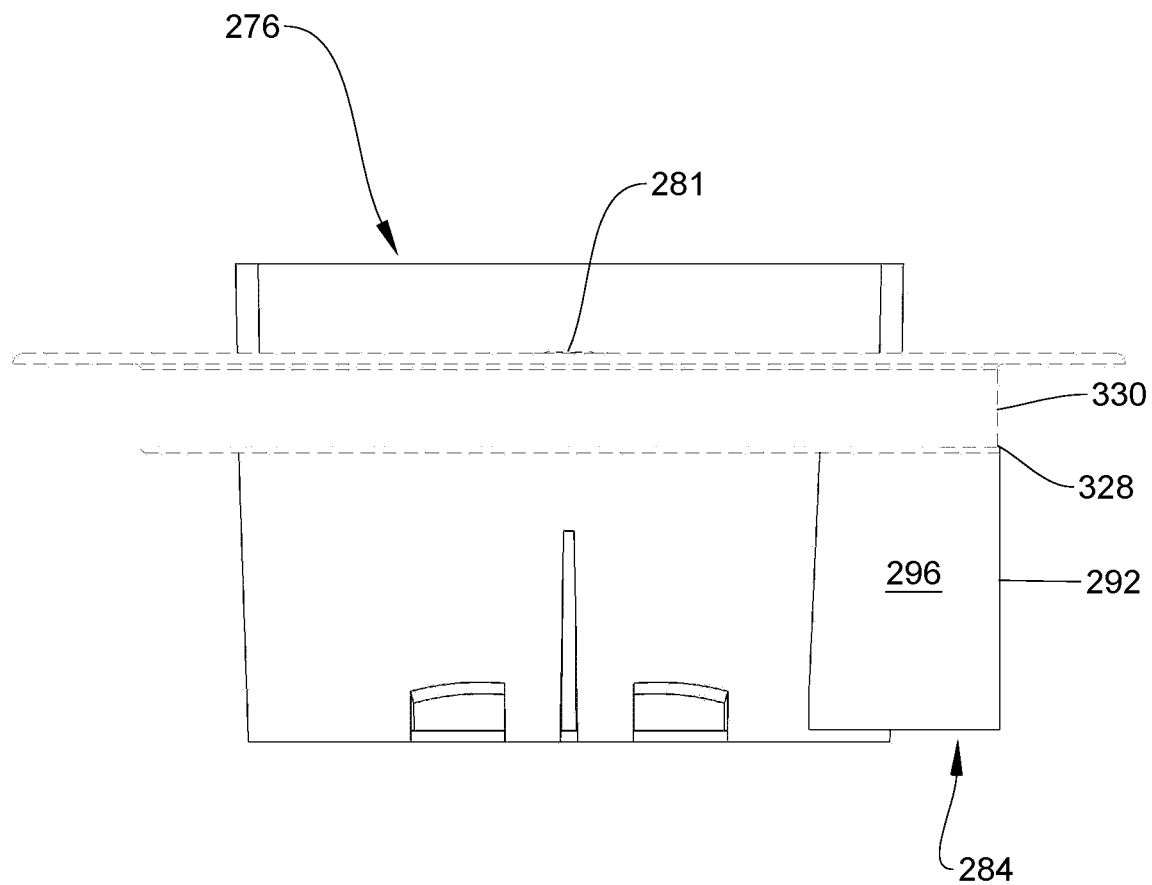
FIG. 18 is an orthographic view of the enclosure of FIG. 16 from a side orthogonal to the round enclosure externally situated fastener housings distal faces.

In Electrical Box With Fastening Device embodiments presented in all but FIGS. 16-18, the box body has typical features including four sides all connected to a box body back (128). The box body open face (126) is open and may be larger than the box body back (128) in the case of tapered box bodies. Pre-formed cable openings (130) with removable tabs (not shown) or weak point knock outs (not shown) may be placed at or near the back of the box to allow for cable entrance to the box. These may be located at a chamfered or filleted area of the box formed between transverse sides (116), in the case of single device boxes, and the box body back (128). The box may optionally contain devices such as clamps or grommets to assist in securing and protecting the cable, again not shown.

Referring to FIGS. 2 and 3: The first (104) and second (106) externally situated fastener housings are mirror images of each other about what would be the transverse axis of the box body for single gang boxes. The box body housing side possesses one or a plurality of box body openings (122, 123).

The externally situated fastener housings are generally formed with the following portions: a first (132) and second (134) housing distal face, a first (136) and second (138) proximal housing face, a first (140) and second (142) exterior side, a first (144) and second (146) interior side. Additionally, the housings have a first (148) and second (150) housing top which are the sides parallel and most proximate to the box body open face (126). Lastly the housings have a first and second housing bottom (152,154) opposite the first and second top respectively.

Figure 4:
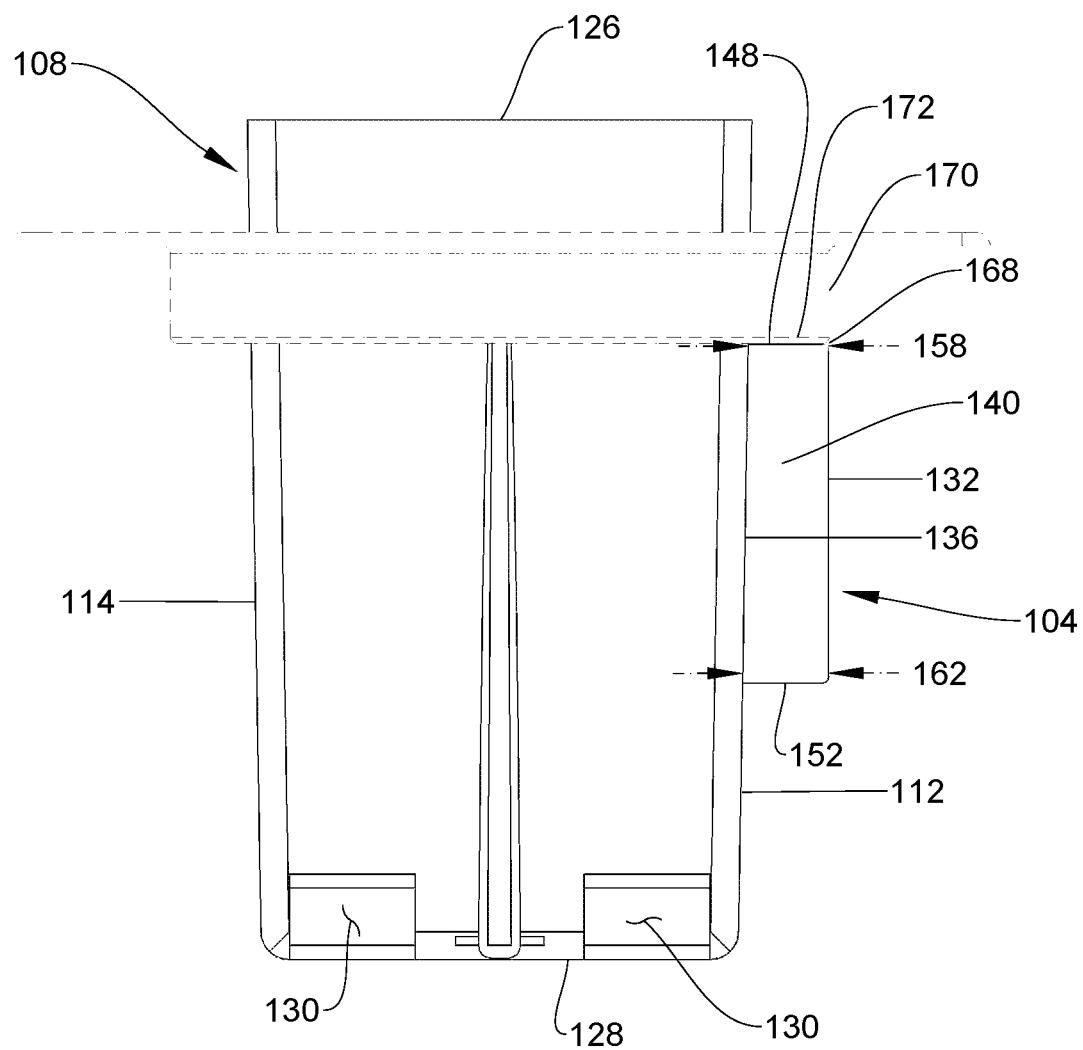
FIG. 4 is an orthographic view of the preferred embodiment of the invention, employing a non-claimed flange and channel element, from one transverse side as representative of both transverse sides.

Referring to FIG. 4: The orthogonal drawing now shows the Electrical Box With Fastening Devices illustrated with a flange and channel as non-claimed flange and channel element (shown in short dashed lines throughout all figures). In the following eight paragraphs the first externally situated fastener housing (104) is described as representative of both fastener housings of the preferred embodiment.

On account of the taper of this and most electrical boxes, the fastener housing generally possess a right trapezoid cross section orthogonal to the distal face (132). The top (148) of the housing has a lesser transverse dimension (158) than the bottom transverse dimension (162) to compensate for this box taper.

The housing distal face proceeds orthogonally from a plane parallel to the box body open face (126) towards the box body back (128), which is generally parallel to and opposite the box body open face. The housing proximal face (136) follows the form of the box body and, as such angles away from the housing distal face (132) as proceeding towards the box body back (128).

As shown in FIG. 4, the intersection (168) of the housing top (148) and distal face (132) aligns with the flange and channel outside vertical portion (170), if employed. The housing top abuts the flange and channel bottom portion (172). The first (152) housing bottom may optionally be parallel to its respective top (148).

The structure described in the preceding paragraphs assures the electrical box front face will be generally vertical when the housing distal faces (132, 134) are placed against framing.

Figure 5:
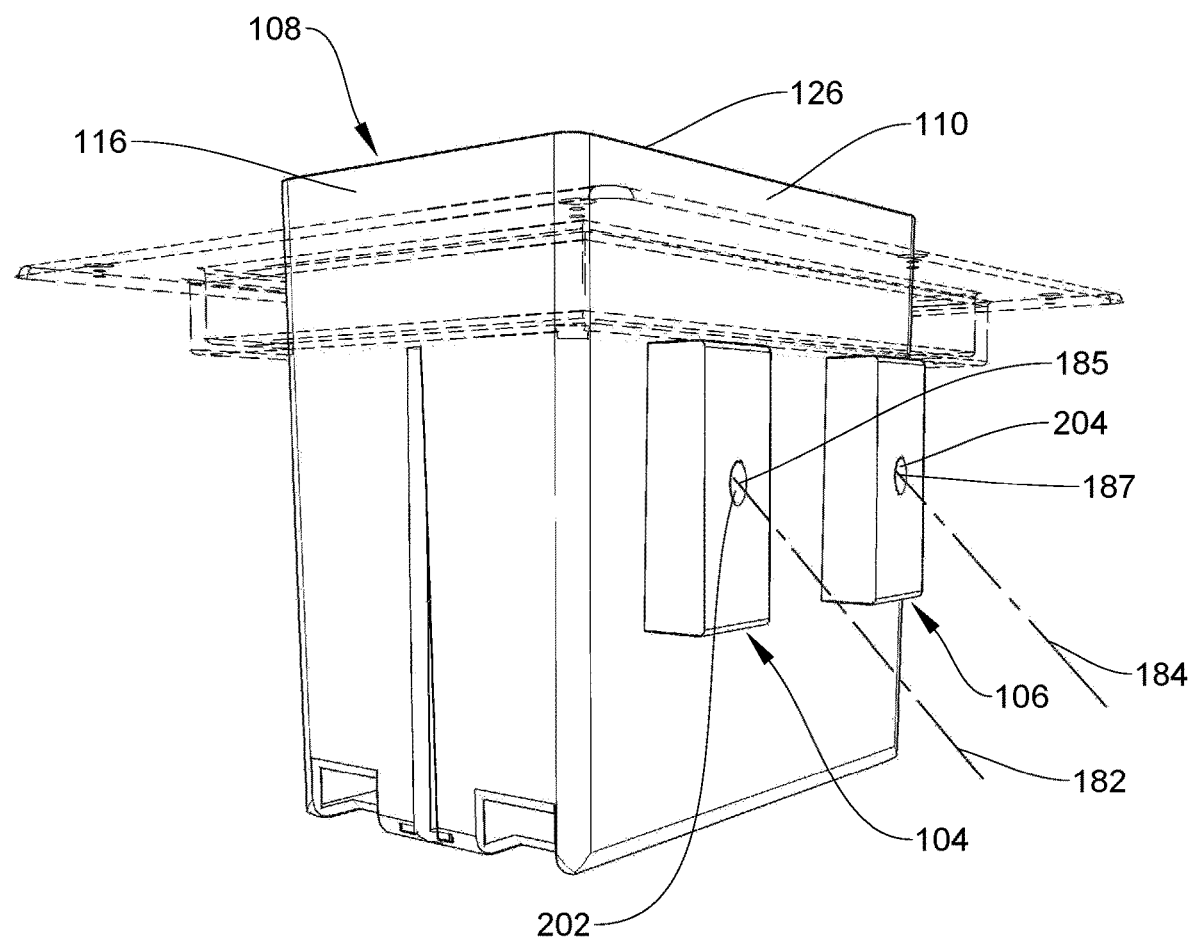
FIG. 5 is a perspective view of the electrical box of FIG. 4 showing the box housing side and one transverse side.
Figure 6:
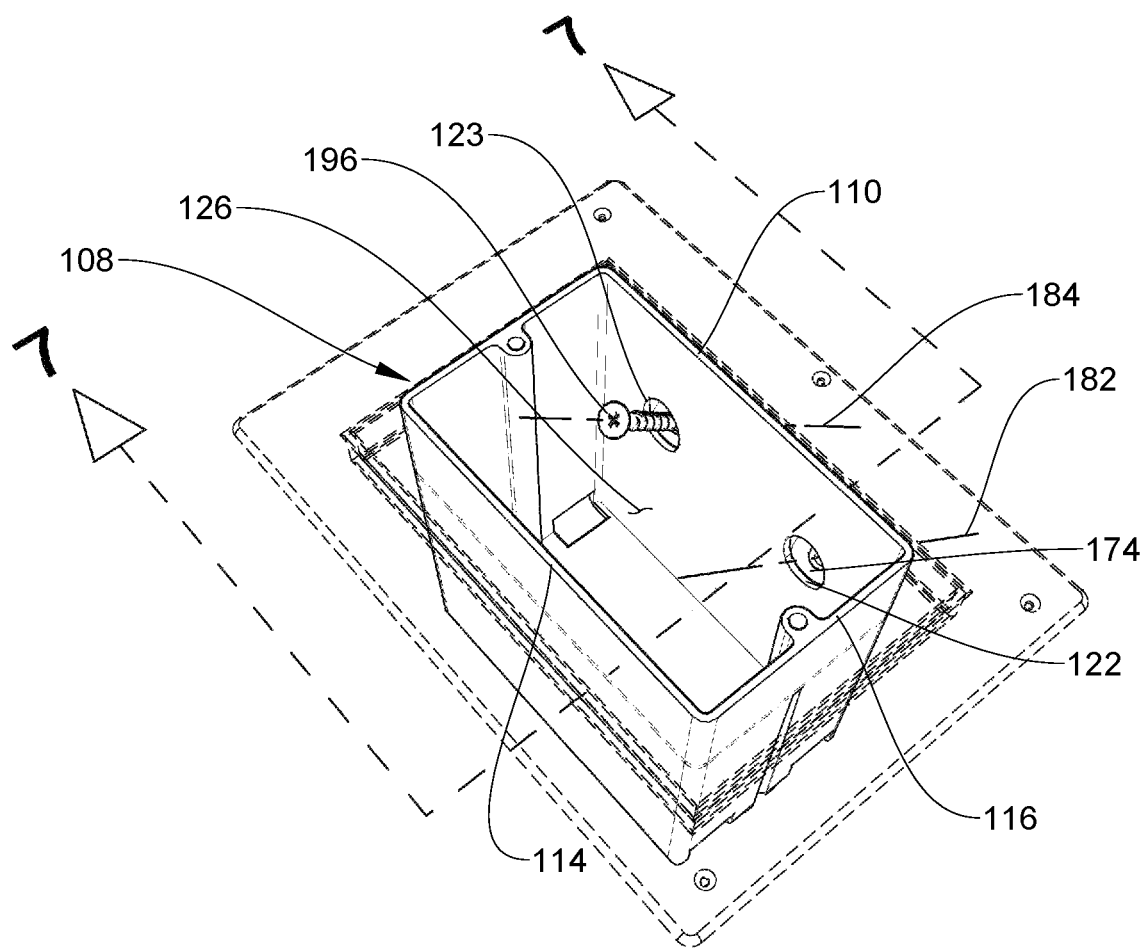
FIG. 6 is an alternate perspective view of the electrical box of FIG. 4 principally showing portions of the box body interior and defining section 7.
Figure 7:
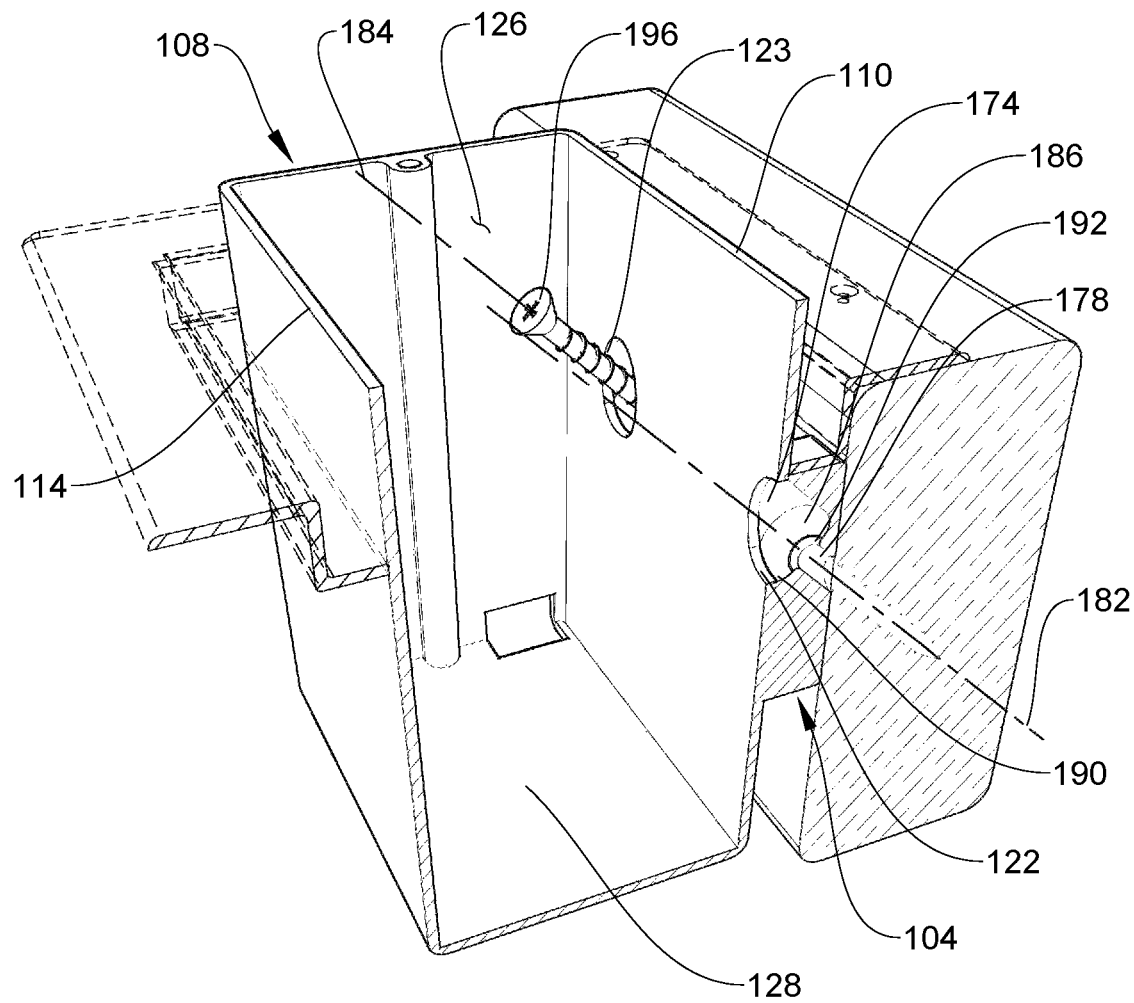
FIG. 7 is a sectional perspective view of the electrical box of FIG. 4 sectioned through one externally situated fastener housing and placed adjacent to a sectioned portion of framing. One fastener shown presented but not inserted into framing.

Referring to FIGS. 5-7: Again, the first housing is described as representative of both housings in some figures. The externally situated fastener housings possess two recesses, a fastener head recess (174; FIG. 7 only) and a fastener shaft recess (178; FIG. 7 only) for the first housing and similar recesses for the for the second housing (not referenced in FIGS. 5-7). These fastener head recesses may be formed as circular planes extruded along a partial length of the first fastener axis (182) and second fastener axis (184) and are thus cylindrical as a non-limiting form. The fastener shaft recesses may also be formed as circular planes extruded along another partial length of the fastener axes again forming a different, smaller cylindrical form. Other shapes for these extruded planes are contemplated including but not limited to various polygons (including squares) and ellipses. Where the fastener axes meet the housing distal faces are the fastener exit points (185, 187; FIG. 5 only). Where the fastener shaft recesses intersect the housing distal faces are the first and second distal face fastener openings (202, 204).

The angle formed between the fastener axes (182, 184) and a plane parallel to the box body open face (126) and intersecting the points (185, 187) where the fastener exits the fastener housing at the housing distal face is chiefly determined by two opposing factors: 1) the desire for this angle to be minimized to facilitate initial fastener perforation of framing and 2) the need for this angle to be maximized to allow, in the case of screws, a drill bit holder and drill chuck to partially enter the box body interior to complete the screw installation. For a typical single gang box, angles of between 40 and 60 degrees may be acceptable with 45 degrees being a non-limiting example of an angle which will allow for drill or impact driver with bit holder to access the box body interior to fully insert the screw into framing. The 45-degree angle between the fastener axis and face of framing may be sufficiently great to facilitate fastener point entrance into framing and thus allow the fastener to be driven without movement other than along the fastener axis.

Referring to FIGS. 6 and 7: The fastener head recess (174) dimensions should be large enough to permit the fastener head to completely pass out of the box body interior through the box body opening (122) and into the head recess. This requires a head recess dimension orthogonal to the fastener axis (182) larger than the fastener head plus a margin and sufficiently deep as described below. In the instance that fastener head recess (174) is cylindrical, as shown in the figures as a non-limiting form, the projection onto the box body exterior side and thus of the box body opening (122) is an ellipse.

The transition between the fastener head recess and the fastener shaft recess is the recess transition portion (186 FIG. 7 only; not referenced for the second housing). For the non-limiting example described in the figures, the fastener transition portion (186) is a circular plane with a concentric circular opening orthogonal to and concentric with the fastener axis and placed at the intersection of the fastener head recess (174) and the fastener shaft recess (178). The outer dimension of this transition portion (186) generally coincides with that of the shape used to form the head recess and the inner dimension coincides with that of the shape used to form the shaft recess. The recess transition portion substantially stops the fastener head and thus fastener movement along the fastener axis limiting fastener travel to coincide with the desired penetration of framing.

The fastener transition portion may be truncated (190; FIG. 7 only) where it meets the box body housing side at the box body opening (122). The dimensions of the head recess at this truncation (190) must be sufficiently great to allow the fastener head to reside completely in the head recess and clear of the box body considering the shape of the fastener head. In FIGS. 6 and 7, the fastener (196) is shown placed at the second housing in the presentation position, that is with the point of the screw aligned with the housing distal plane.

The intersection between the fastener transition portion, a circular plane in the figures, and both or either of the fastener head or shaft recess may optionally be filleted. Only the intersection between the transition portion and the shaft recess is filleted (192) in the figures. The radius of the filleting must be sufficiently small so as to allow the fastener head to be sufficiently close to the fastener transition portion (186) so as to allow the fastener to fully reside within the fastener head recess.

The fastener shaft recess should be of sufficient dimension along the fastener axis, that is the shaft recess length, to support the fastener in the presentation position before being driven and at the proper angle for insertion into framing.

The preferred dimension of the fastener shaft recess (178) may be of such size as to minimally contact the fastener outside portion of threads, thereby restraining the fastener in place both orthogonal to the fastener shaft recess and along its length. It is preferred that the fastener shaft recess dimension not, however, be so restrictive as to allow the fastener threads to excessively engage the shaft recess walls and thus to pull the housing and thereby the box away from the framing material while driving the screw.

The fastener (196) in the presented position at the second housing (FIGS. 6 and 7) is a #6 wood screw 1½ inches long as a non-limiting example of a fastener that should provide sufficient box restraint when installed at both fastener housings into wood framing. This screw is matched with a shaft recess diameter of ⅛ inch again as a non-limiting example. The recess shown in the sectioned framing portion is that which would be made by this fastener. Should use of a larger size screw be desired the shaft recess diameter may accordingly be increased or, with the shaft recess being unchanged and thus undersized for the larger screw, the box can be restrained, that is held against framing, by the installer while the screws are driven.

If the shape of the fastener shaft recess is cylindrical, the projection onto the housing distal face (132, 134) is an ellipse and thus the distal face fastener opening (202, 204 FIG. 5 only) is an ellipse whose major and minor axis are determined by the diameter of the shaft recess and the angle of the shaft recess to the housing distal face. Other shape examples are shown and described below in this detailed description.

Figure 8:
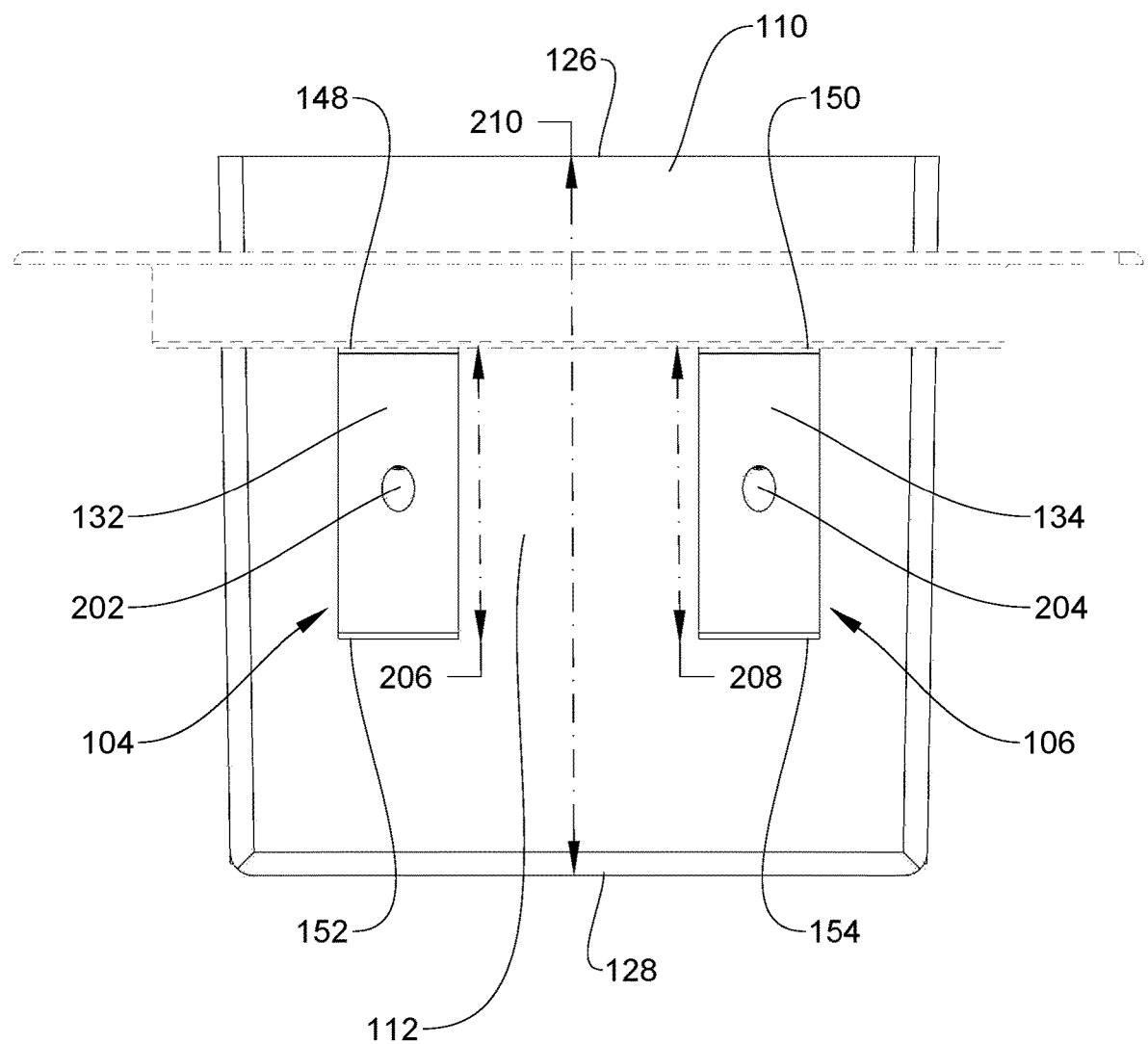
FIG. 8 is an orthographic view of the electrical box of FIG. 4 from the box housing side.

Referring to FIG. 8: All dimension lines in figures are shown in broken lines. For both the first and second housings, the dimension between the externally situated fastener housing tops (148, 150) and bottoms (152, 154) is the externally situated fastener housing's length (206, 208) at the box body housing side (110). This length should be sufficient to provide adequate resistance to rotation about the longitudinal axis of the electrical box or movement of the box towards or away from framing once installed. The distance between the box body open face (126) and box body back (128) is the box body housing side (110) length (210). For an electrical box without flange and channel element, as shown in FIGS. 2 and 3, the housing length (206, 208) providing substantially adequate box stability is between 30% to 60% of the box body housing side length (210) as a non-limiting range. Employing the non-claimed flange and channel element may reduce the minimum housing length.

A non-limiting fastener housing placement along this box housing side exterior wall length is such that the distance from housing tops (148, 150) to the box body open face (126) will be approximately equal to the distance between the housing bottoms (152, 154) and the box body back (128). With the fastener axes at 45 degrees, this arrangement places the distal face fastener openings (202, 204) at the approximate center of the box housing side (110) length (210).

Figure 9:
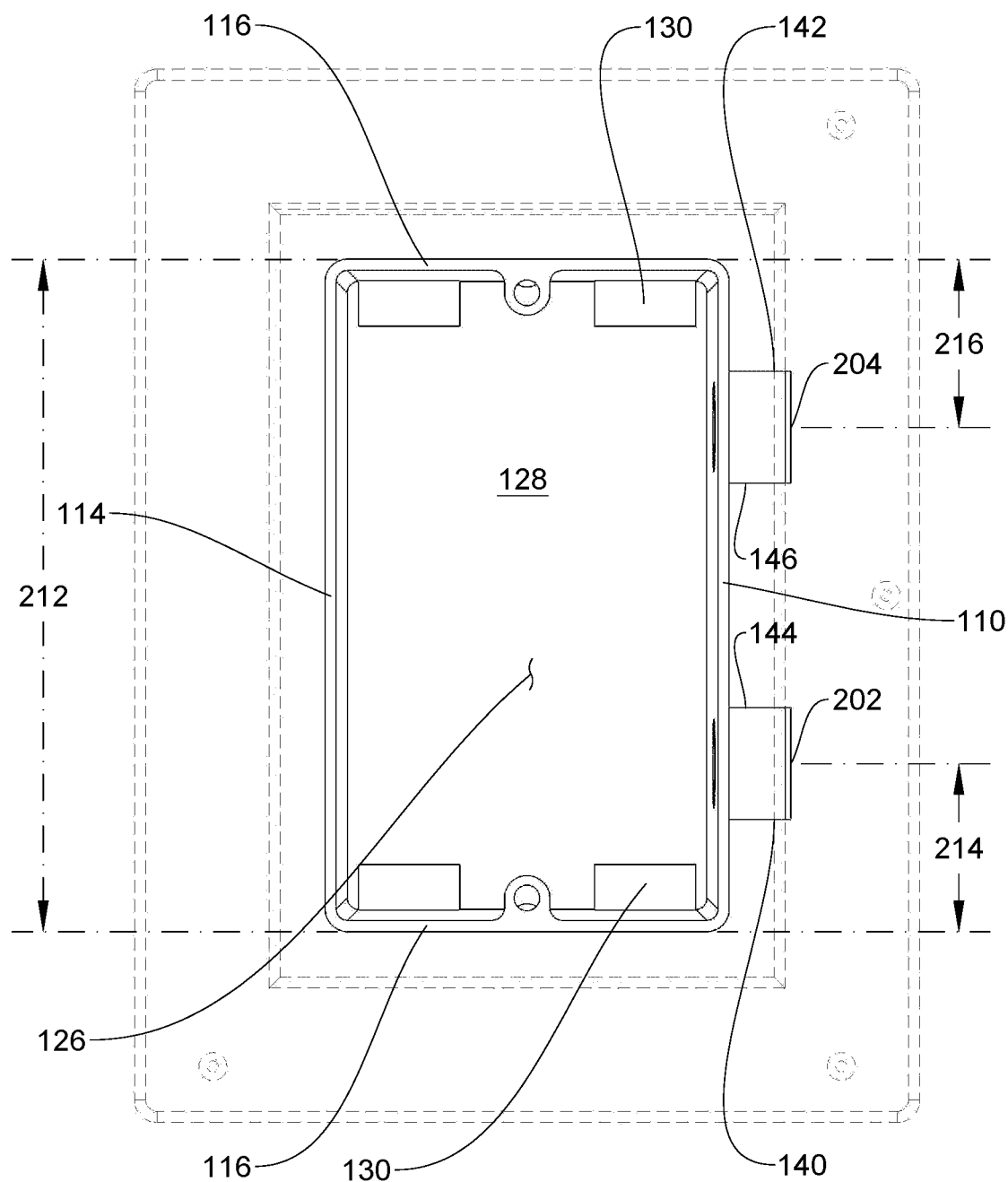
FIG. 9 is an orthographic view of the electrical box of FIG. 4 from the box body open face.

Referring to FIG. 9: For a single gang box, the dimension along the box body housing side from one box body transverse side (116) to the opposite box body transverse side (116) measured at the box body open face is the box body housing side width (212). This dimension is reduced as proceeding from the box body open face (126) to the box body back (128) for tapered boxes (not shown in figures).

The placement of the externally situated fastener housings along the box body housing side width (212) should be such that the installed electrical box will be substantially stable, meaning limited lateral movement especially at either of the transverse sides. As a non-limiting example, the placement of the housings along the box housing side width with a dimension (214 for first housing, 216 for second) of 25% of the total box body housing side width (212) between nearest box body transverse side and distal face fastener opening (202, 204) center is presented. Accordingly, again as a non-limiting example, the separation of the first housing from the second housing as measured from the first distal face fastener opening center to the second distal face fastener opening for this arrangement would be 50% of the housing side width (212).

The dimensions and proportions given in the preceding three paragraphs are non-limiting examples of those substantially providing electrical box installed stability. These dimensions and proportions may vary for electrical boxes that are deeper or shallower, those whose front face is larger than those described or for those employing an optional flange and channel element.

Again, referring to FIG. 3: The width of the externally situated fastener housings is the distance between the first (140) exterior side and first (144) interior side for the first housing and similarly (142, 146) for the second housing. This width should be sufficient to provide area for the previously discussed fastener head recess placed about the center of this width. Additionally, the width should provide for sufficient minimum thickness (218) between the fastener head recess wall (220) and the adjacent exterior or interior housing side. This minimum thickness (218) should resist head recess and housing deformation when the driven fastener pulls the electrical box towards framing. This minimum thickness should also provide sufficient contact or overlap area with the box body housing side exterior wall for resisting this deformation whether the externally situated fastener housing is formed with the box body or adhesively bonded as will be discussed later in the detailed description.

Figure 10:
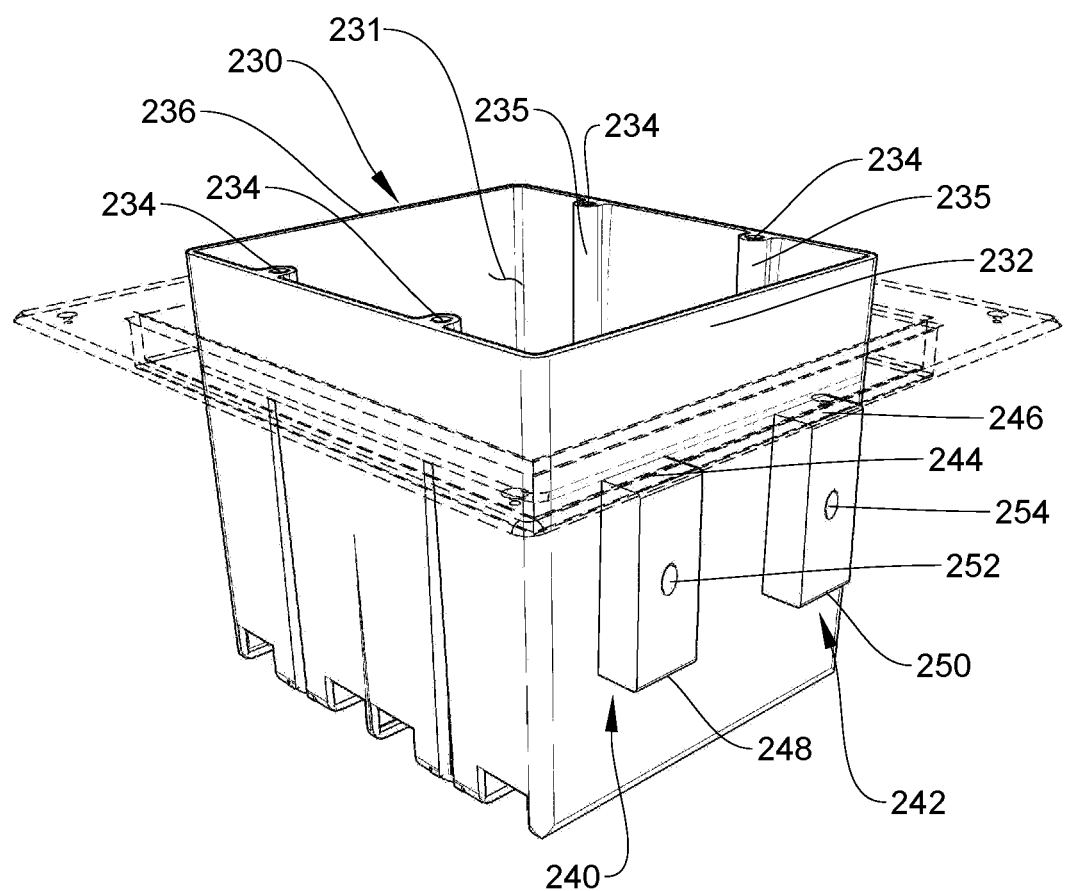
FIG. 10 is a perspective view of the two-gang embodiment of the invention, employing a non-claimed flange and channel element, principally showing the box housing side and one mounting hole structure side.
Figure 11:
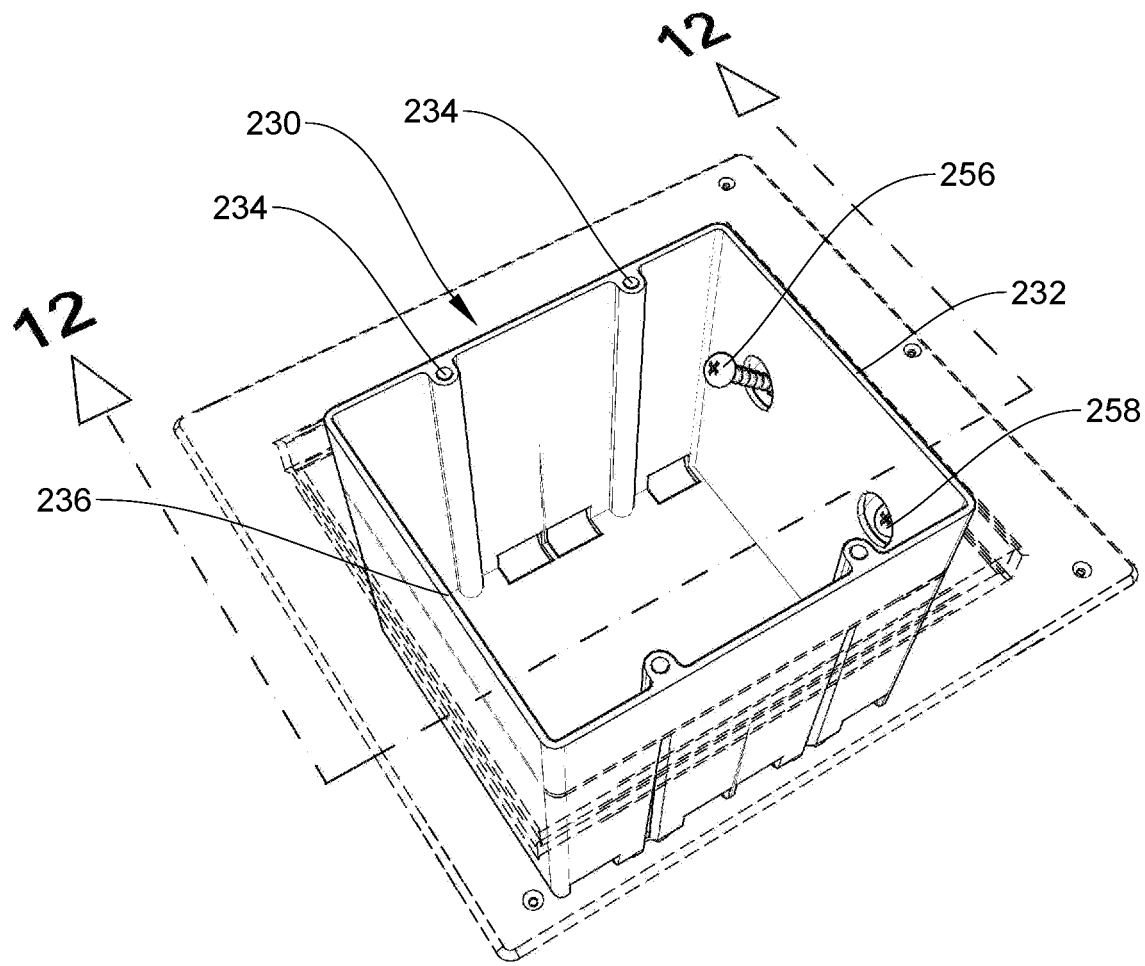
FIG. 11 is an alternate perspective view of the electrical box of FIG. 10 principally showing portions of the box body interior, one mounting hole structure side as representative of both such structure sides, and defining section 12. One fastener shown presented and one fastener in its final location after being inserted.
Figure 12:
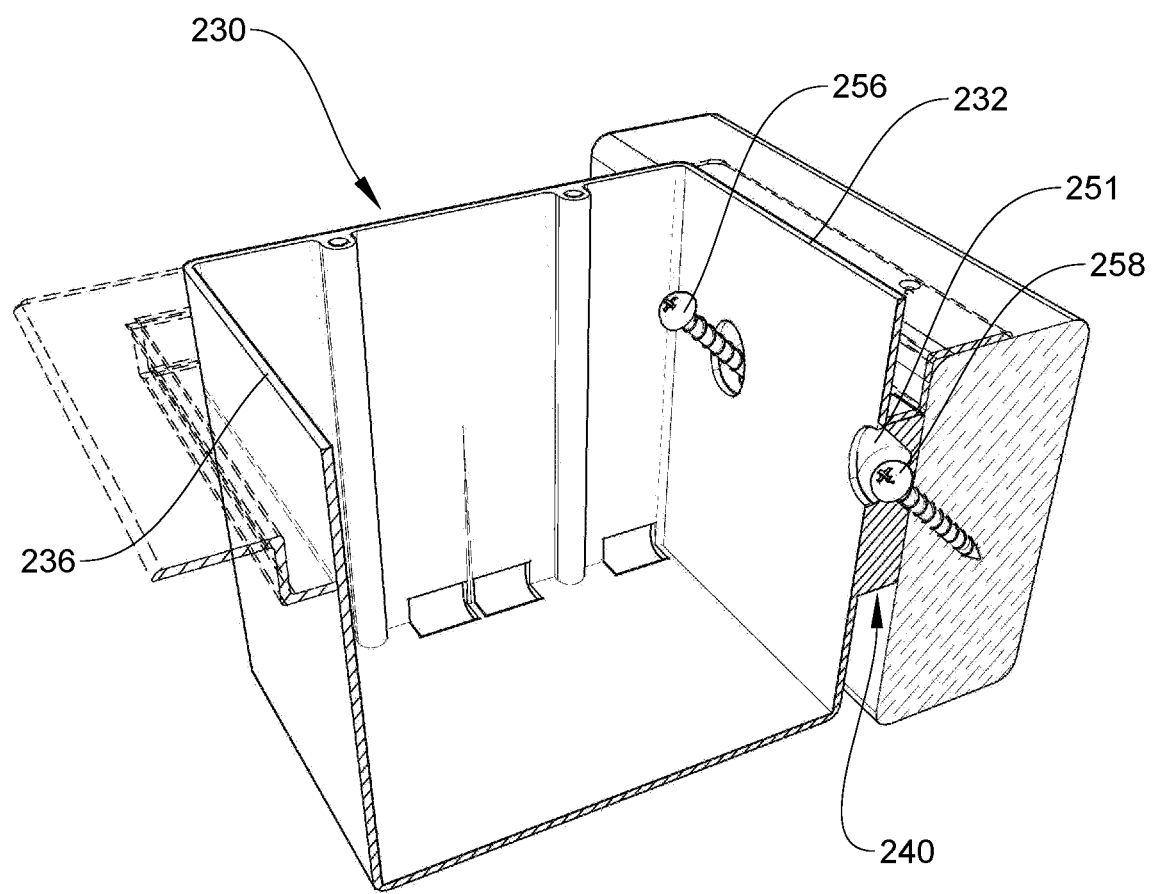
FIG. 12 is a sectional perspective view of the electrical box of FIG. 10 sectioned through one externally situated fastener housing and partially fastened to a sectioned portion of framing. One fastener shown presented and one fastener shown inserted into framing and not sectioned.

Referring to FIGS. 10-12: The two-gang embodiment of the Electrical box With Fastening Devices is presented as representative of two-gang and larger (3, 4 gang etc.) electrical boxes. Again, the electrical box is illustrated with the non-claimed flange and channel element illustrated in dashed lines. The two-gang box body (230) now accommodates two outlets and thus possesses two pair of opposite placed outlet mounting screw threaded holes (234) and the mounting structures (235) forming these holes. As the boxes are generally rectangular or the threaded hole structure sides are longer than those orthogonal to them, the terms transverse and longitudinal will not be used here. The two-gang housing side (232) is again located at one of the box sides orthogonal to the side with the outlet mounting screw threaded holes and structures (235).

Two two-gang externally situated fastener housings, a first (240) and second (242), are placed on the two-gang housing side (232). As the two-gang electrical box housing side (232) and their exterior walls are generally of the same dimensions and proportions and the single gang box, the placement, function and description of the two-gang externally situated fastener housings are as with the single gang box and will not be repeated. Only differences between the two gang and larger boxes and the single gang will be described below.

The dimension between the two-gang housing side (232) and non-housing side (236) is now increased and, as such, the fastener axis angle relative to the plane parallel to the box body open face (231) and intersecting the point where the fastener axis and distal face intersect may optionally be decreased as there is more box body interior room to accommodate the driving tool.

For larger than two-gang, that is 3, 4 gang etc. outlet boxes, the fasteners used to attach the box to framing may need to be longer and/or larger to resist increased rotational forces rotating the non-housing side away from the open face plane. These rotational forces and increased compressive forces from these fasteners may require larger externally situated fastener housings than those previously described to prevent deformation and other failures. The minimum thickness of the fastener head recess wall (251; FIG. 12 only), previously described and illustrated in FIG. 3 for single gang boxes, may need to increase. Portions of the housings including the two gang housing top's (244, 246) and bottom's (248, 250) width and transverse dimensions may need to be increased to resist the stresses of larger boxes. The distal face fastener openings (252, 254; FIG. 10 only) will occur at a point more proximate to the box body back in the instance of these described housing modifications.

Round head screws as an optional representation of fasteners are shown in FIGS. 11 and 12 in the presentation (256) and driven (258) positions. In FIG. 12, the screw is not sectioned for clarity. The two or multi-gang box body is symmetrical and may be fastened to the left or right of framing by rotating the box 180 degrees.

Figure 13:
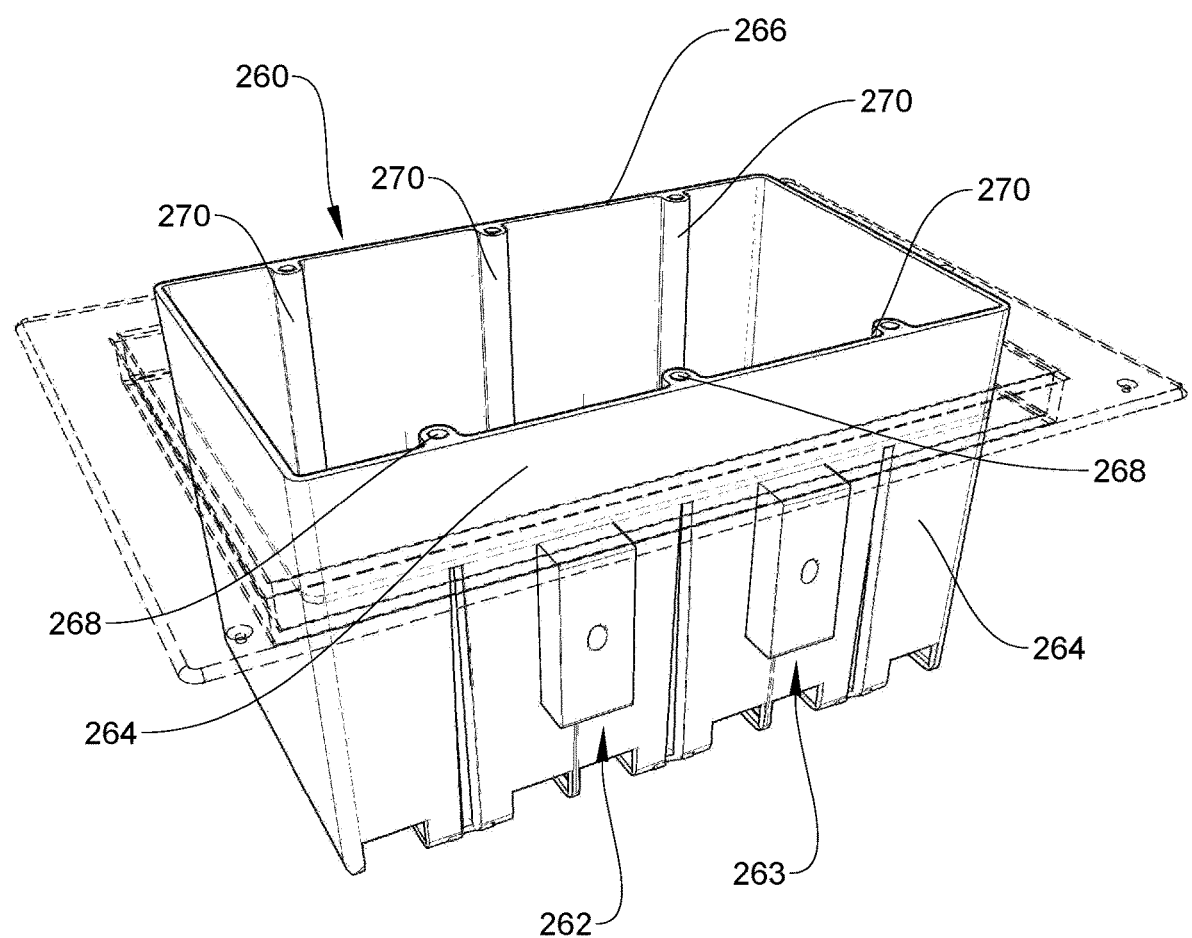
FIG. 13 is a perspective view of the bottom mount embodiment of the invention, employing a non-claimed flange and channel element, principally showing the bottom mount housing side.
Figure 14:
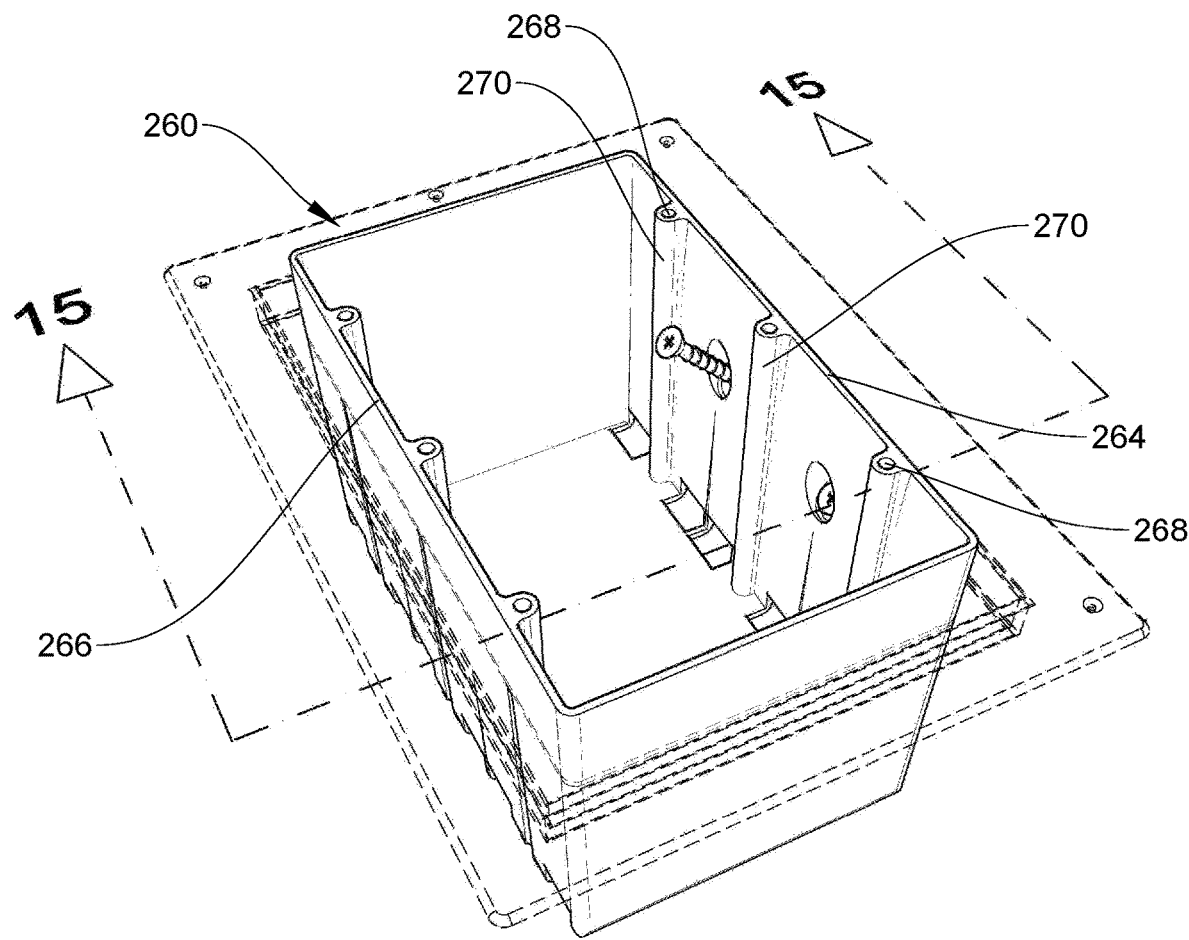
FIG. 14 is an alternate perspective view of the electrical box of FIG. 13 principally showing the bottom mount box body interior and defining section 15. One fastener shown presented and one fastener in its final location after being inserted.
Figure 15:
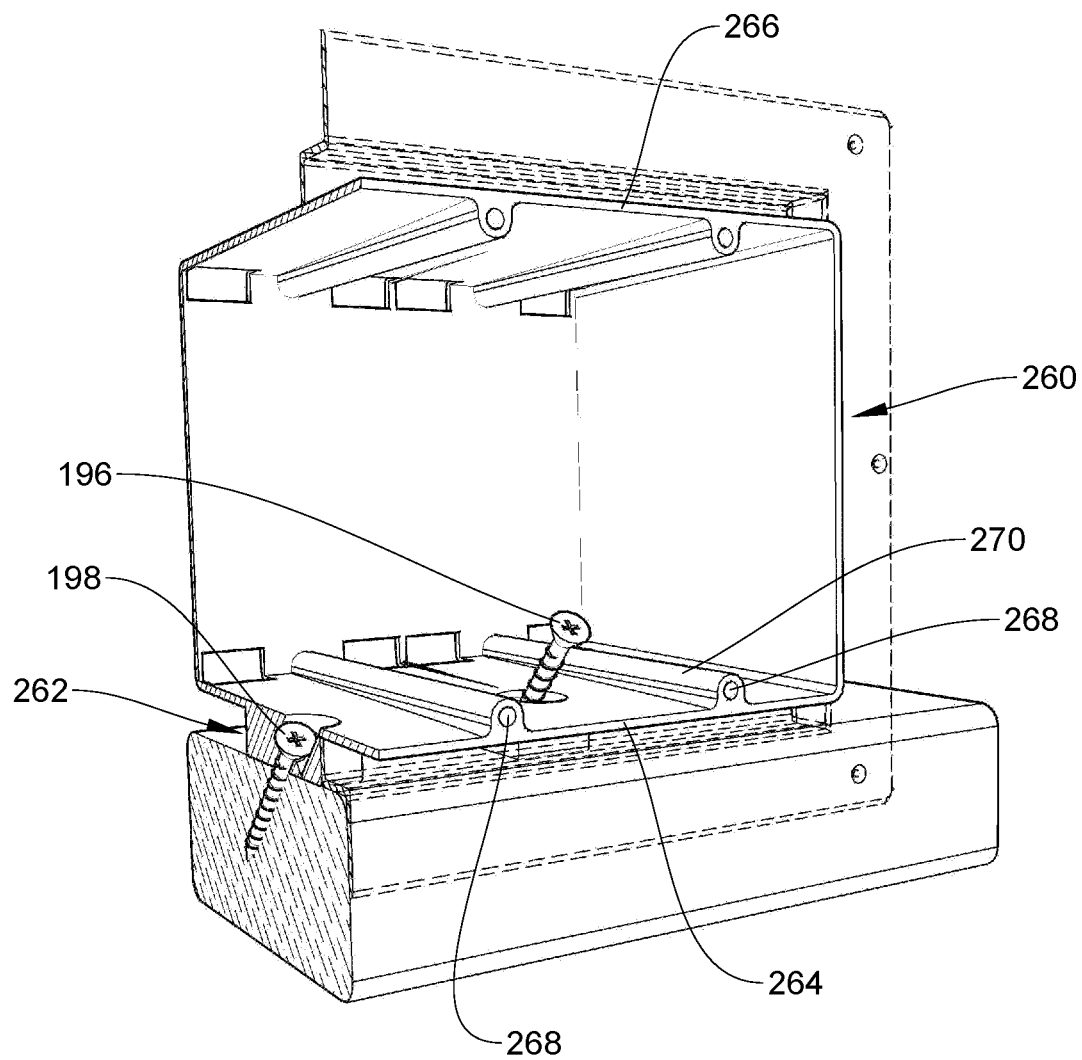
FIG. 15 is a sectional perspective view of the electrical box of FIG. 13 sectioned through one externally situated fastener housing and partially fastened to a sectioned portion of horizontal framing. One fastener shown presented and one fastener shown inserted into framing and not sectioned.

Referring to FIGS. 13-15: The bottom mount embodiment of the Electrical Box With Fastener Housings is presented. This box is intended for applications where a three gang or larger multi-gang box is mounted on horizontal framing (blocking) between vertical framing-especially that which is 24 inches on center. Note the box has been rotated clockwise between FIGS. 14 and 15 to better depict this instance. As with other embodiments, the bottom mount box is shown with the flange and channel element illustrated in dashed lines as a non-claimed element. Only the horizontal framing is depicted in FIG. 15 and it is shown sectioned.

A first (262) and second (263) bottom mount externally situated fastener housing are now placed on one of the bottom mount box body (260) sides with mounting screw threaded holes mounting structures (270), that side now referred to as the bottom mount housing side (264). The figures show two housings mounted between the outlet mounting screw threaded hole (268) mounting structures (270). The fastener housings may be placed along the width between the structures forming these holes and along the length of the bottom mount housing side as previously described for single gang boxes. For larger boxes such as four and five gang boxes, additional housings may be placed in between the threaded holes mounting structures.

The bottom mount electrical box externally situated fastener housings are generally of the same portions and function as with those described with the single gang box and therefore will not be repeated. Only differences between the bottom mount electrical boxes and the single gang boxes will be described.

As the fastener housings are mounted on what is the long side of the box, the rotational forces expected by the box are less than that which would be expected by multi-boxes using the side mounted housings. The moment arm for a force rotating the box away from where the fastening screw enters framing is smaller for the bottom mount box than the moment arm for a similar box with side mounted housings. As such, the externally situated fastener housing dimensions and proportions for the bottom mount electrical box may be as with those of the single gang box and do not need to be increased as previously described for large boxes with side mounted housings. The number of housings may increase to the number of outlets less one. As the bottom mount electrical embodiment is symmetrical about its long center axis, the box is reversable to mount with the housings on the side of the installation facing up.

As with the two-gang box, the dimension between the housing side (264) and non-housing side (266) is increased and, as such, the fastener axis angle relative to the plane parallel to the box body open face and intersecting the point where the fastener axis intersects the housing distal face may optionally be decreased as there is more box body interior room to accommodate the driving tool. FIGS. 14 and 15 show and FIG. 15 references a presented (196) and a driven flat head screw fastener (198).

Referring to FIGS. 16-18: The round electrical enclosure embodiment of the Electrical Box With Fastening Devices is now shown and described. The enclosure is illustrated with the round embodiment of the flange and channel as a non-claimed element shown in dashed lines. The round enclosure has a round enclosure body (276) comprised of a cylindrical portion (277), a round enclosure body back (278), a round enclosure open face (279) and oppositely positioned round embodiment outlet mounting screw threaded holes (281) and the mounting structures (282) forming them.

The round enclosure embodiment has a first (284) and second (286) round enclosure externally situated fastener housing placed on the body exterior orthogonal to the axis between the mounting holes. This is the round enclosure body housing side (291) which possesses one or a plurality of round enclosure body openings (321, 323 FIG. 17 only).

The round enclosure externally situated fastener housings each possess a fastener axis (312, 314) and are mirror images of each other about an axis centered between the first and second housing's interior sides (288, 290). The round enclosure distal faces (292) and (294), for the first and second housings respectively, may be co-planar rectangles. The round enclosure housings tops (304) and (306), may be co-planar shapes, linear on three sides, intersect the distal faces at right angles, and follow the form of the enclosure body on the proximal side. The interior sides of the round enclosure fastener housings may be parallel to each other, linear on four sides, intersect the distal faces at right angles, and follow the form of the enclosure body on the proximal side to form a right trapezoid. As with other presented boxes, the box body taper results in the housing bottoms being larger the tops, specifically the dimension between the distal and proximal faces.

The exterior sides of the round enclosure housings (296) and (298), for the first and second housings respectively, may be parallel to the interior sides, linear on four sides, intersect the distal faces at right angles, and follow the form of the enclosure body on the proximal side to form a right trapezoid. As the box body diverges from the housings as proceeding away their respective interior sides, the exterior sides are larger than the interior. The arrangement and relationships given in this and the preceding paragraph represent non-limiting examples of round embodiment fastener housings.

That the housing interior sides have minimum dimensions based on structural considerations, and given that the exterior sides are larger than the interior necessitates that the housing fastener shaft recess, which is placed between the two, be longer than those of the single or two-gang embodiment. As such, the angle between the fastener axis and a plane parallel to the round enclosure body open face (279) and intersecting the point where the fastener axis intersects the distal face may need to decrease. Alternatively, as is shown in the figures, the dimension between both the housing tops and bottoms and the distance between the distal faces and the box body may increase to accommodate the longer fastener recess. In this instance, the round enclosure distal face fastener openings (316, 318) occur more proximate to the enclosure body back (278) along the distal face. The dimension between the housing interior and exterior sides, that is the housing width, may remain the same. The round enclosure housing head recesses, (320) and (322), are shown in FIG. 17 as having a rectangular form, a form which may be used for the head recess as a non-limiting example of alternative forms of that housing portion. This rectangular head recess form may optionally be used for all boxes presented by this application.

Referring to FIG. 18: For embodiments employing the flange and channel element as is shown in the figures, the planes of the distal faces need to align with the tangent point (328) of the round flange and channel element outside vertical portion (330) orthogonal to the mounting holes (281) axis. Only the first round enclosure fastener housing (284) and its distal face (292) are referenced in FIG. 18)

Figure 19:
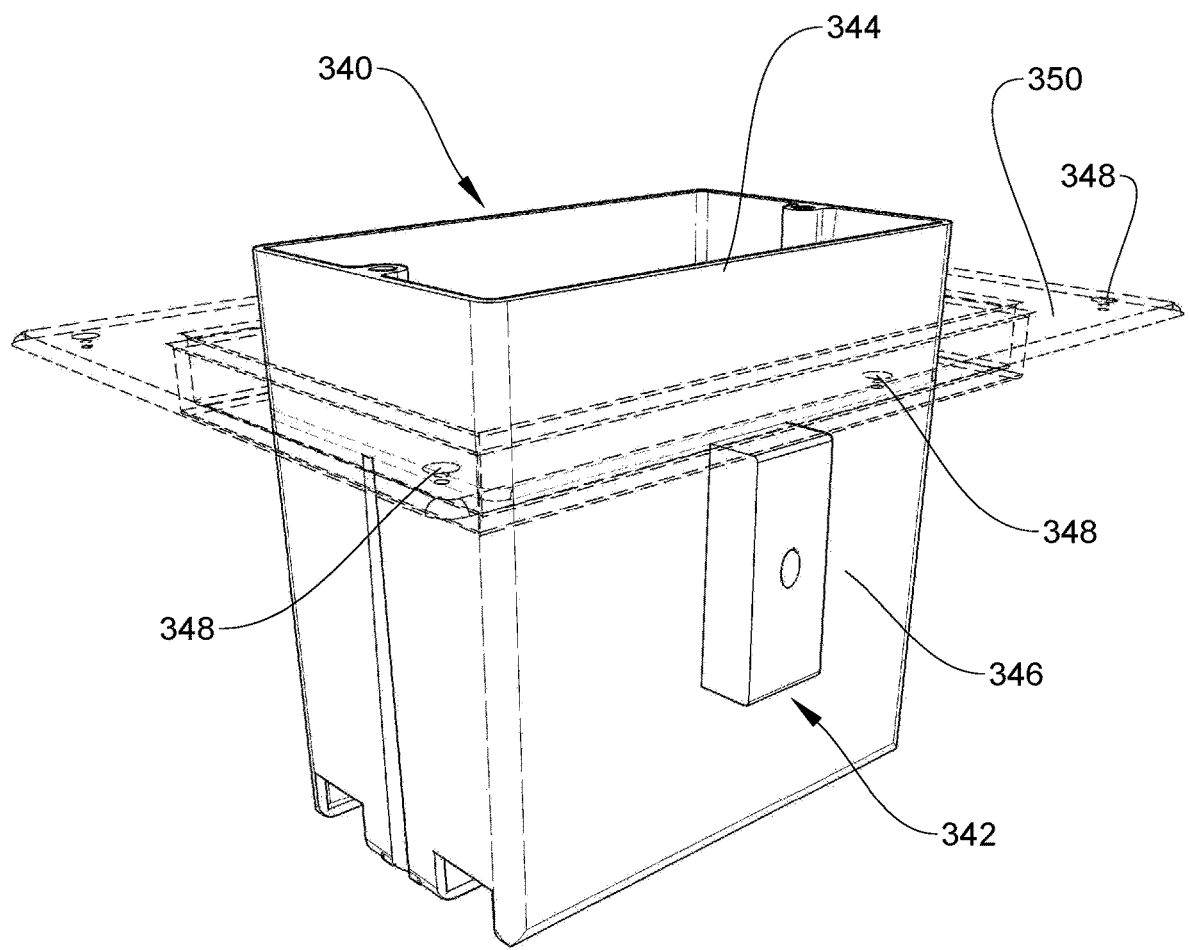
FIG. 19 is a perspective view of the single housing embodiment of the invention, employing a non-claimed flange and channel element, principally showing the box housing side and one transverse side.
Figure 20:
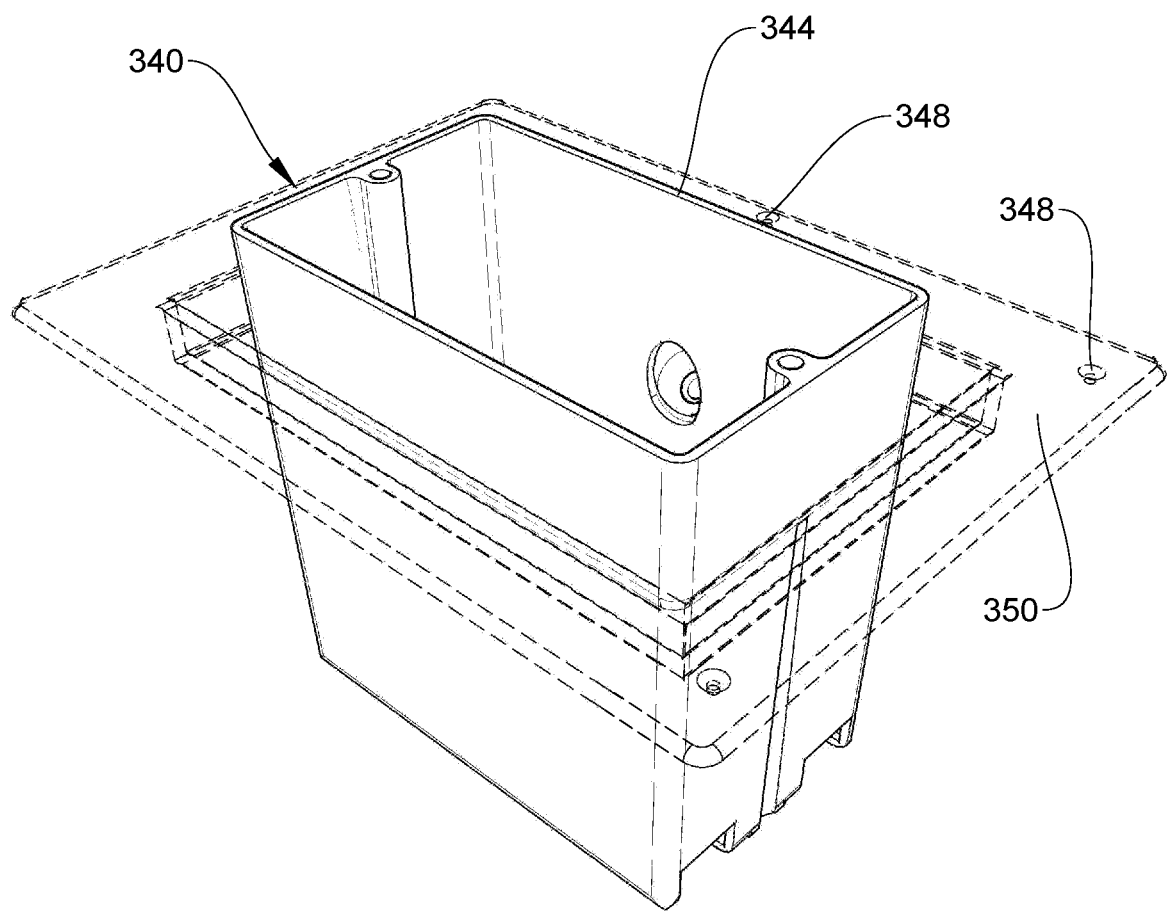
FIG. 20 is an alternate perspective view of the electrical box of FIG. 19 showing the box body interior.

Referring to FIGS. 19 and 20: Shown is the single externally situated fastener housing embodiment of the Electric Box With Fastening Devices intended for single gang boxes which may be used with the non-claimed flange and channel element illustrated in the figures. The single fastener housing (342) is now placed at the at the center of the single box body (340) housing side (344) exterior wall (346). As with the single gang two housing box, the housing side may be either of the longitudinal sides. The fastener housing may be in all respects as with the preferred embodiment presented in FIGS. 4-9 with the exception of the placement of the housing along the housing side width.

One externally situated fastener housing may not provide sufficient installed box stability without the presence of supplemental stabilizing elements. For this reason, the box may be complemented with the flange and channel element, as a non-limiting example, to provide additional stability. In this example, the box may be fastened with fasteners through the pre-formed openings (348) present on the flange face portion (350), preferably at two opposite locations.

Figure 21:
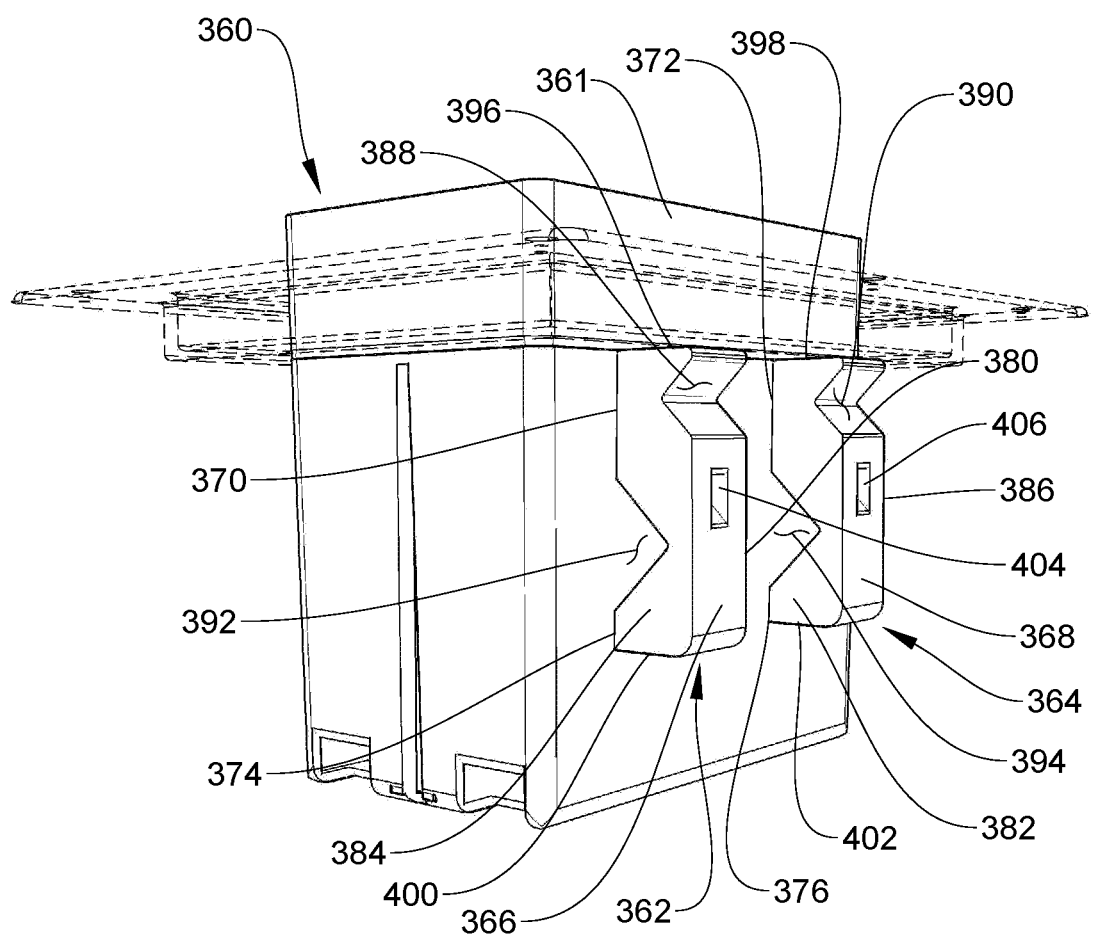
FIG. 21 is a perspective view of the chamfered housing embodiment of the invention, employing a non-claimed flange and channel element and chamfered externally situated fastener housings, showing the box housing side and one transverse side.

Referring to FIG. 21: The chamfered housing embodiment of the Electrical Box With Fastening Devices is presented. A first and second chamfered externally situated fastener housing (362, 364 respectively) are now placed at a chamfered housing box body (360) housing side (361). The chamfered fastener housings have portions of the fastener housing body of the preferred embodiment of FIG. 1-9 removed. The housing portions or volumes removed may be formed by triangular planes at the interior sides (380, 382) and/ or exterior sides (384, 386) being extruded along the width of the housing. Other shapes for the extruded planes and thus for the removed volumes may be used. The respective chamfered housing distal (366, 368) faces are reduced in size and the proximal faces are divided into top portions (370, 372) and bottom portions (374, 376). The distal face chamfers (388, 390) and proximal face chamfers (392, 394) should be of such dimensions as to not weaken or compromise the remaining housing's structure. The housing tops (396, 398) and bottoms (400, 402) may remain as with the preferred embodiment of the housing including the top and bottom transverse dimensions.

Shown in FIG. 21 is the rectangular distal face fastener opening (404, 406), which along with the fastener shaft recess is an optional alternative to the cylindrical forms of the preferred embodiment. The rectangular fastener shaft recess (not shown in drawing) is formed by a square or rectangular plane extruded along the fastener axis. The dimensions of the plane's sides may be such as to minimally contact the fastener outside portion of fastener threads, thereby restraining the fastener in place both orthogonal to the rectangular fastener shaft recess and along its length. It is preferred that the fastener shaft recess dimensions not, however, be so restrictive as to allow the fastener threads to excessively engage the shaft recess walls and thus to pull the housing and thereby the box away from the framing material while driving the screw.

The chamfered housing embodiment of the Electrical Box with Fastening Devices is in function as with the previously described preferred embodiment and interfaces with framing and fasteners in a like manner.

The presence of chamfers or other like modifications may produce efficiencies in the manufacturing of the fastener housings given particular box body and housing production materials and methods. The modified forms should be sufficiently resistant to deformation or other failures.

For all embodiments of the Electrical Box With Fastening Devices presented by this application, the externally situated fastener housing may be formed as one element together with the electrical box body at the same time the box is formed or by molding subsequent to box body fabrication.

The electrical box can be manufactured using currently available precision plastic injection molding manufacturing methods including multi component injection molding (such as double shot molding and overmolding). The electrical box and its components can be formed into the shapes shown in FIGS. 1-21 from typical thermoplastic materials including but not limited to polycarbonate, PVC, PPE blends or fiberglass reinforced polyester.

Alternatively, the housing may be formed by available precision plastic injection molding manufacturing methods of the described materials separately from the box body and attached, adhesively or otherwise, at box locations as described in this detailed description and drawings, later in manufacture. This method may be advantages as it will not interfere with tapered box nesting for shipping purposes.

All embodiments of the Electrical Box with Fastening Devices may have additional optional forms and may vary in order to facilitate manufacture while retaining the characteristics of the invention.

The invention claimed is:

1. An electrical box with fastening devices comprising:
   four box body sides and a box body back joined where they meet and that together with a box body open face form an electrical box body wherein one said box body side is a box body housing side, said box body housing side possessing one or a plurality of box body openings, and
   one or a plurality of externally situated fastener housings joined to a box body housing side, said externally situated fastener housing or housings further comprising:
   a fastener axis,
   a fastener head recess substantially aligned and cooperating with one said box body opening, the fastener head recess placed concentrically about the fastener axis and proceeding outwardly from the box body housing side along the fastener axis and terminating at a fastener transition portion, and
   a fastener shaft recess substantially aligned and cooperating with the fastener transition portion, the fastener shaft recess placed concentrically about the fastener axis and proceeding outwardly from the fastener transition portion along the fastener axis towards a housing distal face wherein the fastener shaft recess intersects with said housing distal face and forms a distal face fastener opening, the fastener head recess, the fastener transition portion and the fastener shaft recess together circumscribing portions of a fastener, limiting fastener travel along the fastener axis and constraining and guiding the fastener along the fastener axis, so as to facilitate electrical box fastening to building assembly framing.

2. The electrical box with fastening devices of claim 1 wherein the box body housing side is generally orthogonal to the box body side possessing one or a plurality of outlet mounting screw threaded holes.

3. The electrical box with fastening devices of claim 1 wherein the box body housing side is the box body side possessing one or a plurality of outlet mounting screw threaded holes.

4. The electrical box with fastening devices of claim 1 wherein one or a plurality of externally situated fastener housings are modified by removing portions so as to facilitate manufacturing.

5. The electrical box with fastening devices of claim 1 wherein one or a plurality of externally situated fastener housings are formed with portions other than the box body so as to facilitate manufacturing.

6. The electrical box with fastening devices of claim 1 wherein one or a plurality of the fastener head recesses and/or one or a plurality of the fastener shaft recesses are substantially cylindrical in form.

7. The electrical box with fastening devices of claim 1 wherein one or a plurality of the fastener head recesses and/or one or a plurality of the fastener shaft recesses are formed by extruding substantially polygonal or elliptical shapes along portions of the fastener axis.

8. The electrical box with fastening devices of claim 1 wherein one or a plurality of externally situated fastener housings are formed together with the electrical box body by plastic injection molding manufacturing methods.

9. The electrical box with fastening devices of claim 1 wherein one or a plurality of externally situated fastener housings are formed separately from the electrical box body by plastic injection molding manufacturing methods and subsequently joined to the electrical box body formed separately by plastic injection molding manufacturing methods.

10. The electrical box with fastening devices of claim 1 wherein the electric box body and/or the externally situated fastener housings are formed using thermoplastic materials including but not limited to polycarbonate, PVC, PPE blends or fiberglass reinforced polyester.

11. A round electrical enclosure embodiment of the electrical box with fastening devices, said round electrical enclosure embodiment comprising:

a cylindrical portion and a round enclosure body back joined where they meet and that together with a round enclosure open face form a round enclosure body possessing a plurality of diametrically opposed outlet mounting screw threaded holes wherein one portion of the round enclosure body generally orthogonal to an axis formed by said outlet mounting screw threaded holes is a round enclosure body housing side possessing one or a plurality of round enclosure body openings, and one or a plurality of round enclosure externally situated fastener housings joined to a round enclosure body housing side, said round enclosure externally situated fastener housing or housings further comprising:

a fastener axis, a fastener head recess substantially aligned and cooperating with one said round enclosure body opening, the fastener head recess placed concentrically about the fastener axis and proceeding outwardly from the round enclosure body housing side along the fastener axis and terminating at a fastener transition portion, and a fastener shaft recess substantially aligned and cooperating with the fastener transition portion, the fastener shaft recess placed concentrically about the fastener axis and proceeding outwardly from the fastener transition portion along the fastener axis towards a round enclosure housing distal face wherein the fastener shaft recess intersects with said round enclosure housing distal face and forms a round enclosure distal face fastener opening, the fastener head recess, the fastener transition portion and the fastener shaft recess together circumscribing portions of a fastener, limiting fastener travel along the fastener axis and constraining and guiding the fastener along the fastener axis, so as to facilitate round electrical enclosure fastening to building assembly framing.

12. The round electrical enclosure embodiment of the electrical box with fastening devices of claim 11 wherein one or a plurality of round enclosure externally situated fastener housings are modified by removing portions so as to facilitate manufacturing.

13. The electrical box with fastening devices of claim 11 wherein one or a plurality of round enclosure externally situated fastener housings are formed with portions other than the enclosure body so as to facilitate manufacturing.

14. The round electrical enclosure embodiment of the electrical box with fastening devices of claim 11 wherein one or a plurality of the fastener head recesses and/or one or a plurality of the fastener shaft recesses are substantially cylindrical in form.

15. The round electrical enclosure embodiment of the electrical box with fastening devices of claim 11 wherein one or a plurality of the fastener head recesses and/or one or a plurality of the fastener shaft recesses are formed by extruding substantially polygonal or elliptical shapes along portions of the fastener axis.

16. The round electrical enclosure embodiment of the electrical box with fastening devices of claim 11 wherein one or a plurality of round enclosure externally situated fastener housings are formed together with the round enclosure body by plastic injection molding manufacturing methods.

17. The round electrical enclosure embodiment of the electrical box with fastening devices of claim 11 wherein one or a plurality of round enclosure externally situated fastener housings are formed separately from the round enclosure body by plastic injection molding manufacturing methods and subsequently joined to the round enclosure body formed separately by plastic injection molding manufacturing methods.

18. The round electrical enclosure embodiment of the electrical box with fastening devices of claim 11 wherein the round enclosure body and/or the round enclosure externally situated fastener housings are formed using thermoplastic materials including but not limited to polycarbonate, PVC, PPE blends or fiberglass reinforced polyester.

\* \* \* \* \*